United States Patent
Huang

(10) Patent No.: US 9,377,326 B2
(45) Date of Patent: Jun. 28, 2016

(54) POWER-ASSISTED BICYCLE HAVING SENSOR WITH MULTIPLE MAGNET POSITIONS AND MAGNETIC FLUXES UNEVENLY DISTRIBUTED IN SHELL

(71) Applicants: CHENGDU KUANHE TECHNOLOGY CO., LTD., Chengdu, Sichuan (CN); Qiang Huang, Chengdu, Sichuan (CN); Song Gao, Chengdu, Sichuan (CN); Yanxiong Ouyang, Chengdu, Sichuan (CN)

(72) Inventor: Qiang Huang, Sichuan (CN)

(73) Assignees: CHENGDU KUANHE TECHNOLOGY CO., LTD., Chengdu, Sichuan (CN); Qiang Huang, Chengdu, Sichuan (CN); Song Gao, Chengdu, Sichuan (CN); Yanxiong Ouyang, Chengdu, Sichuan (CN)

( * ) Notice: Subject to any disclaimer, the term of this patent is extended or adjusted under 35 U.S.C. 154(b) by 0 days.

(21) Appl. No.: 14/417,794

(22) PCT Filed: Jun. 5, 2013

(86) PCT No.: PCT/CN2013/076822
§ 371 (c)(1),
(2) Date: Jan. 28, 2015

(87) PCT Pub. No.: WO2014/019413
PCT Pub. Date: Feb. 6, 2014

(65) Prior Publication Data
US 2015/0204695 A1    Jul. 23, 2015

(30) Foreign Application Priority Data
Jul. 28, 2012 (CN) .......................... 2012 1 0263504

(51) Int. Cl.
G01D 5/14 (2006.01)
B62M 6/50 (2010.01)
G01D 5/244 (2006.01)
G01D 5/245 (2006.01)
G01D 5/249 (2006.01)
B62M 6/65 (2010.01)

(52) U.S. Cl.
CPC ................. G01D 5/145 (2013.01); B62M 6/50 (2013.01); B62M 6/65 (2013.01); G01D 5/244 (2013.01); G01D 5/2455 (2013.01); G01D 5/2492 (2013.01)

(58) Field of Classification Search
CPC ... G01D 5/2455; G01D 5/2492; G01D 5/145; B62M 5/50; B62M 6/65
See application file for complete search history.

(56) References Cited

U.S. PATENT DOCUMENTS 5,788,007 A * 8/1998 Miekka ................. B60L 3/0061
                                                                180/205.1
6,131,683 A * 10/2000 Wada ....................... B62M 6/55
                                                                180/216

(Continued)

*Primary Examiner* — Tony Winner

(57) ABSTRACT

A power-assisted bicycle having a sensor with multiple magnet positions and magnetic fluxes unevenly distributed in a shell includes a sensor which includes a sensing element, a power assistance model processor, a digital-to-analog converter and an operational amplifier which are connected successively. The sensing element includes a rotary wheel, a static wheel, permanent magnets and a Hall component which are embedded within a hollow internal of the rotary wheel and said static wheel. On the rotary wheel, magnetic poles of the neighboring permanent magnets are opposite; the permanent magnets are spaced differently and have different magnetic fluxes. The Hall component on the static wheel is provided in proximity to the permanent magnets. The sensor is sleeved onto a middle shaft; the OPA is connected to a motor controller. Relative positions between the permanent magnets and the Hall component are fixed; the Hall component obtains a rectangular wave signal.

10 Claims, 6 Drawing Sheets

(56) References Cited

U.S. PATENT DOCUMENTS

| | | | | |
|---|---|---|---|---|
| 6,163,148 A * | 12/2000 | Takada | ..................... | B62M 6/45 180/206.3 |
| 6,247,548 B1 * | 6/2001 | Hayashi | .............. | B60L 11/1801 180/206.2 |
| 7,191,861 B2 * | 3/2007 | Bui | ......................... | B62M 6/40 180/206.1 |
| 2012/0010036 A1 * | 1/2012 | Moeller | ................... | B62M 6/45 475/149 |
| 2014/0252923 A1 * | 9/2014 | Wang | ................. | H02K 11/0042 310/68 B |
| 2014/0365013 A1 * | 12/2014 | Kruse | ..................... | B62M 6/65 700/275 |
| 2015/0077096 A1 * | 3/2015 | Cambou | ............. | G01R 33/096 324/207.21 |
| 2015/0203172 A1 * | 7/2015 | Huang | ................ | G01D 5/2451 180/206.3 |

* cited by examiner

POWER-ASSISTED BICYCLE HAVING SENSOR WITH MULTIPLE MAGNET POSITIONS AND MAGNETIC FLUXES UNEVENLY DISTRIBUTED IN SHELL

CROSS REFERENCE OF RELATED APPLICATION

This is a U.S. National Stage under 35 U.S.C. 371 of the International Application PCT/CN2013/076822, filed Jun. 5, 2013, which claims priority under 35 U.S.C. 119(a-d) to CN 201210263504.3, filed Jul. 28, 2012.

BACKGROUND OF THE PRESENT INVENTION

1. Field of Invention

The present invention relates to power-assisted bicycles, and more particularly to an electric power-assisted bicycle having multiple magnetic induction points arranged on a rotary element to provide power assistance signal.

2. Description of Related Arts

As disclosed in the Chinese patent application Claw-type Moment Sensing Device, CN201020295192.0, by CHINA YEBAO BICYCLES INC. (KUNSHAN) CO., LTD, the sensing device for the power-assisted bicycles comprises the magnetic element and the elastic element cooperating with the magnetic element, so as to sense the moment. After a long-time service, the change in the elasticity coefficient of the elastic element leads to the change in the control effects between the sensing signal and the controlled motor; the power assistance effect becomes mis-matched with the user power assistance demand. The complicated structure of the elastic element raises the manufacture cost.

As disclosed in the Chinese patent Automatic Detection Device for Electric Power-assisted Bicycle, with the application number of CN01201843.0, by UNIVERSITY OF SCIENCE AND TECHNOLOGY BEIJING, the automatic detection device for the electric power-assisted bicycles is capable of detecting the pedal force, the speed and the steering direction without contact. In the automatic detection device, the magnetic sheets are respectively provided on the inner wheel and the outer wheel in the relative motion. The spring is provided on the inner wheel. The inner and the outer wheels are recovered via the spring. The two Hall components are provided on the rack to induce the relatively moving magnetic sheets on the inner and the outer wheels, and thereby the electric signals are generated to indicate the pedal force, the speed and the steering direction.

Firstly, the elastic element has a poor durability. After a long-time service, the elasticity coefficient of the elastic element changes, so that the control effects between the sensing signal and the controlled motor also changes. As a result, the power assistance effect becomes mis-matched with the user power assistance demand. The complicated structure of the elastic element raises the manufacture cost.

Secondly, each group of the magnetic sheets is identical with each other and has the same magnetic poles arrangement, so as to fail to represent respective positions of the different groups of the magnetic sheets and be disenabled to express special power assistance demand at different positions. As disclosed in FIGS. 3, 4, 5 and 6 and paragraph 2 on page 2 of the specification in the Chinese patent with the application number of CN01201843.0, each group of the magnetic sheets, comprising a first magnetic sheet 4, a second magnetic sheet 5 and a third magnetic sheet 6, has the same magnetic poles arrangement; in other words, the identical groups of the magnetic sheets are merely repeatedly provided at different positions of the inner wheel, thereby failing to represent the respective positions of the different groups of the magnetic sheets and to express a motion state at a specific position. When the user is riding on the bicycle, the pedal and the motion state of the pedal at the corresponding position have the correspondingly special power assistance demand. However, the Chinese patent with the application number of CN01201843.0, fails to express the special power assistant demand of the pedal at the respective position due to the identical structure of each group of the magnetic sheets.

Thirdly, the signals at different induction points have no difference, causing the man-machine mis-match. Each group of the magnetic sheets is identical, so that each group is unable to represent the position of the group at the inner wheel. The signal outputted by the Hall component is unable to represent the positions of the pedal and other groups of the magnetic sheets, namely the signal outputted by the Hall component is unable to represent the power assistant demand at different positions of the pedal, which results in the mis-match between the power assistance demand and the time of supplying power assistance, i.e., the unsatisfactory man-machine cooperation.

Fourthly, the outputted sine wave restricts the distance between the edge of each group of the magnetic sheets to be no smaller than 4 cm, preferably 5 cm, in such a manner that the permitted number of the groups of the magnetic sheets is too small, also causing the unsatisfactory man-machine cooperation. Each group of the magnetic sheets is identical, and the sine wave is outputted by the Hall component as the control signal. The sine wave as the control signal requires a certain difference between peak and valley. Since the groups of the magnetic sheets need a certain length to represent the forward motion and the backward motion, at most 8 groups, preferably 5 groups, are provided at the circular track of the rotary disc with the ring-shaped groove and the diameter of 20 cm so that the Hall component generates the sine wave signal with the control function. In other words, according to the Chinese patent with the application number of CN01201843.0 for the power-assisted bicycles, the number of the groups is restricted within 8, which results in too few control signals and the unsatisfactory man-machine cooperation. If more than 8 groups of the magnetic sheets are provided, the signal outputted by the Hall component would become almost a horizontal line when the bicycle is running fast, wherein the signal is without the control function and unable to control the motor, which means that the motor is disenabled to provide power assistance when the bicycle particularly needs the power assistance.

Fifthly, the signal blind zone reaches 45°, and the demand for the power assistance when launching the bicycle may be unsatisfied. As is known to all, the moment of the pedal stepped by the man at the top is the smallest, and the range of 10°-45° away from the top is the zone where the power assistance is most necessary. However, in the Chinese patent with the application number of CN01201843.0, the angle between each group of the magnetic sheets is 45°; within the range of 10°-45° away from the top, there is no group of the magnetic sheets, and thus no control signal is generated, which results in that the motor is unable to provide power assistance when the bicycle needs the power assistance the most.

Therefore, besides the poor durability and the complicated structure of the elastic element, the number of the groups of the magnetic sheets is restricted within 8 when the wheel has the diameter of no more than 20 cm, due to the structural cooperation between the Hall component and the magnetic sheets. With the number of the groups of the magnetic sheets strictly controlled, the man-machine cooperation is unsatisfactory; the motor is unable to assist the launch of the bicycle, and the demand for the power assistance is mis-matched with the supply of the power assistance, which results in the poor comfort for the bicycle riders. If the number of the groups of the magnetic sheets is added forcibly, the sensing signal loses the control function over the power assistance.

As disclosed in the Chinese patent with the application number of CN03264387.X by Wang Naikang, titled Timing Sensor for Electric Power-assisted Bicycle, no elastic element is involved; only the movable wheel and the static wheel are provided. The movable wheel is embedded with the two permanent magnets; the static wheel is embedded with the three Hall components. When the pedal rotates one circle, each Hall component generates two pulses, and the three Hall components generate six pulses. The features and the defects thereof are as follows.

Feature (1): in order to obtain the six pulse signals, the same magnetic poles of the permanent magnets are provided at the same side. Each Hall component is intended to generate two pulses, and thus the same magnetic poles of the two permanent magnets are provided at the same side of the movable wheel, namely either two north poles or two south poles of the two permanent magnets are provided at the side of the movable wheel. If a north pole and a south pole respectively of the two permanent magnets are provided at the same side of the movable wheel, when the pedal rotates one circle, each Hall component would generate one pulse, and the three Hall components would generate three pulses, which is different from the disclosure of the Chinese patent with the application number of CN03264387.X. In order to increase the number of the pulses and improve the control effect, the same magnetic poles of the permanent magnets have to be at the same side.

Feature (2): the permanent magnets represent fixed positions of the pedals, and the three Hall components represent motion positions of the pedals. The pedals and the rotary wheel rotate synchronously, so each permanent magnet is respectively mounted at the two positions on the rotary wheel corresponding to the two pedals. Whatever position the pedal is rotated to, the corresponding permanent magnet is rotating to the same position. However, merely by rotating the pedals to the positions where the Hall components are located, the control signal is sent out via the Hall components to instruct the motor of the power-assisted bicycle to generate the demanded power assistance.

Feature (3): since one Hall component is unable to represent the different motion positions of the pedal at the different time in one circle of rotating, merely one Hall component is insufficient. At the different time in one circle of rotating, the pedal has different demand for power assistance. In order to indicate the change in the demand for power assistance, according to the disclosure in the Chinese patent with the application number of CN03264387.X, the three Hall components are respectively provided at the three positions within 180°, wherein two Hall components thereof are mounted at the positions of the two pedals. Once the pedals rotate to the positions where the Hall components are located, the Hall components output the signals, which represents that the pedals are at the positions of the Hall components. Nevertheless, the multiple Hall components have the following defects.

The sensor for the power-assisted bicycle has the following five defects.

Defect (1): the fixed positions of the two pedals are respectively represented by the two identical permanent magnets, and thus the multiple Hall components are required to represent the motion positions of the two pedals. The two permanent magnets are identical so that the fixed positions of the two pedals are represented without distinguishing the left pedal and the right pedal, in such a manner that the left pedal and the right pedal are provided with identical power assistance together. However, the permanent magnets per se are still unable to represent the motion positions of the two pedals; the motion positions of the two pedals have to be represented by the several Hall components which are provided at different angular positions. Therefore, merely one Hall component is insufficient, and the multiple Hall components are necessary.

Defect (2): only one Hall component is insufficient, but the three Hall components certainly results in the original segmental error among the three control signals, which means that the power assistance demand model distorts and the power assistance output is naturally mis-matched with the power assistance demand. No matter the power-assisted bicycle has one motor or two motors, the motor is only under the control of one sensing signal which is inputted into the motor controller. In the Chinese patent with the application number of CN03264387.X, the three Hall components are for controlling the motor, so the three control signals of the three Hall components must be combined into a combined control signal before being inputted into the motor controller. The three Hall components have different sensing parameters. Especially because of the changed environmental temperature and the long-time service, there may be a great difference among the sensing parameters of the three Hall components. As a result, in accordance to the identical power assistance demand, each Hall component output different voltages, leading to different power assistance outputs of the motor. The power assistant outputs become mis-matched with the power assistance demand. Similarly, in accordance to respectively different power assistance demands, each Hall component may output identical voltages, leading to identical power assistance outputs of the motor. The power assistance outputs also become mis-matched with the power assistance demands.

Defect (3): combining the control signals is liable to generate the signal drift so that the combined control signal is mis-matched with the motor controller and the power assistance demand model distorts. Because of the change in the environmental temperature and the long-time service, there may be a great difference among the sensing parameters of the three Hall components; the connection points of the three control signals of the three Hall components certainly changes; and thus, the combined control signal generated by the identical power assistance demand generates the segmental signal drift. The combined control signal, as a whole, generates the signal distortion, namely the power assistance demand model distortion. As a result, no matter which one of the three control signals is chosen by the motor controller as the reference, the power assistance output is always mis-matched with the power assistance demand.

Defect (4): it is forbidden to arbitrarily add the number of the induction points; with the small number of the induction points, the motor operates unstably, which brings discomfort to the bicycle rider. The defects (1) and (2) are caused by the more than one Hall components. Obviously, the defects (1) and (2) would deteriorate by increasing the number of the Hall components. Therefore, the power-assisted bicycle according to the Chinese patent with the application number of CN03264387.X is always uncomfortable for the bicycle rider.

Defect (5): the signal blind zone reaches 42°, and the demand for the power assistance when launching the bicycle is unsatisfied. As is known to all, the moment of the pedal at the top is the smallest, and the range of 10°-45° away from the top is the zone where the power assistance is most necessary. However, in the Chinese patent with the application number of CN03264387.X, the angle between each Hall component is 42.5°-43.5°; within the range of 10°-42° away from the top, there is no Hall component, and thus no control signal is generated, which results in that the motor is unable to provide power assistance when the bicycle needs the power assistance the most.

As a conclusion, according to the Chinese patent with the application number of CN03264387.X, the multiple Hall components are used to control the power assistance, since the multiple Hall components are necessary for representing the motion positions of the pedals. However, the multiple control signals of the multiple Hall components certainly have the original error, while the combined control signal is liable to generate the signal drift, which distorts the power assistance demand model. In other words, the identical power assistance demand at different time is supplied with different power assistance. On one hand, the more Hall components, the more the power assistance demand model distorts. On the other hand, if the number of the Hall components is restricted, the small number of the Hall components results in the unstable operation of the motor, the big discomfort for the bicycle rider and the launch in lack of power assistance. It is mutually contradictory and incompatible to protect the power assistance demand model from distortion and to ensure the stable operation of the motor.

SUMMARY OF THE PRESENT INVENTION

An object of the present invention is to provide a power-assisted bicycle which obtains a velocity signal and a position signal of pedals through one Hall component and each permanent magnet on a rotary wheel with a ring-shaped groove, wherein each permanent magnet is provided at unequal intervals and with unequal magnetic fluxes, and processes the signals with digitization for obtaining a signal sensor with an optimized power assistance model. In the power-assisted bicycle of the present invention, within an induction region of the Hall component, the number of the permanent magnets is maximized; information of displacement of the pedals are fully utilized; and the sensor outputs much information for accurately positioning and fixes relative positions of the Hall component and the multiple permanent magnets via an assembly. For a usage of the power-assisted bicycle of the present invention, a power assistance demand of a bicycle rider is well matched with a power assistance supplied by a motor which operates stably.

Accordingly, in order to accomplish the above objects, the present invention is conceived as follows. Within an induction region of a Hall component, a plurality of permanent magnets are provided on a rotary wheel with a ring-shaped groove, wherein magnetic poles of the plurality of the permanent magnets which face against the Hall component are respectively arranged in an alternation order between a south pole and a north pole, in such a manner that the Hall component is able to sense motion signals of all the permanent magnets. A change manner of all the permanent magnets comprises a magnetic pole change, a position change and a magnetic flux change, in such a manner that the motion signals of the permanent magnets, obtained by the Hall components, have specific positions, more accurate positions, a stronger control function and a larger number. The magnetic poles of the plurality of permanent magnets are arranged in the alternation order between the south poles and the north poles, and thus the Hall component generates a rectangular wave as the signal which has the stronger control function and the larger number. Due to the position change and the magnetic flux change of the plurality of the permanent magnets, the signal generated by the Hall component expresses positions of the permanent magnets at a higher accuracy, so as to express a motion state of the rotary wheel with the ring-shaped groove at the specific position. For the power-assisted bicycle, it is very important to express the motion state of the pedal at the specific position, because the motion state of the pedal directly represents a power assistance demand upon the bicycle by the bicycle rider.

The assembly in a mechanical structure fixes the relative positions between the Hall component and the permanent magnets, so as to generate stable and reliable sensing signals.

Converting the rectangular wave signals, outputted by the Hall component, into digital signals facilitates processing the digital signals of the Hall component with the digitization. During the digitization, a power assistance mathematics model for an optimized man-machine match is added, wherein the power assistance mathematics model is flexibly adjustable according to the man-machine match. The present invention overcomes a difficulty in processing a sine wave signal outputted by a Hall component in conventional technology with digitization. The conventional technology only involves an analog signal processing and excludes the power assistance model which is flexibly adjustable. The present invention breaks a restriction upon the power assistance model by velocity signal conditions and accomplishes the optimized man-machine match.

The present invention has the following structures.

A power-assisted bicycle having a sensor with multiple magnet positions and magnetic fluxes unevenly distributed in a shell comprises an electric power-assisted bicycle and a sensor. The electric power-assisted bicycle has a middle shaft 51; a sleeve pipe 52 is sleeved around an intermediate section of the middle shaft 51. The middle shaft 51 and the sleeve pipe 52 are rotatably connected. A chain wheel 53 is mounted on the middle shaft 51. Two pedals 54 are respectively mounted at two ends of the middle shaft 51. A battery 55 on the electric power-assisted bicycle and a motor controller 29 are connected; a motor 30 on a wheel is connected to the motor controller 29.

The sensor has the following structure and connections.

The sensor comprises a sensing element, a power assistance model processor 21, a digital-to-analog converter (DAC) 27 and an operational amplifier (OPA) 28 which are connected successively.

(1) The sensing element is for converting a rotary motion of a rotary wheel 1 with a first ring-shaped groove into an output of a rectangular wave signal.

The sensing element comprises the rotary wheel 1 with the first ring-shaped groove, a static wheel 40 with a second ring-shaped groove, a Hall component 3 and a plurality of permanent magnets 2. The first ring-shaped groove of the rotary wheel 1 is opposed to the second ring-shaped groove of the static wheel 40. The second ring-shaped groove of the static wheel 40 is embedded within the first ring-shaped groove of the rotary wheel 1, so as to form an embedded hollow shell having the two wheels relatively rotatable. Therein, The first ring-shaped groove and the second ring-shaped groove form a hollow ring 41 where the plurality of the permanent magnets 2 are mounted on the rotary wheel 1. The plurality of the permanent magnets 2 are arranged circumferentially in an irregular manner. The irregular manner is an irregular radius manner, or an irregular distance manner; or, the irregular manner is a combination thereof.

The irregular radius manner is as follows. The plurality of the permanent magnets 2 are arranged within a ring 6 formed by an inner circle 5-1 and an outer circle 5-2. At least one circle between the inner circle 5-1 and the outer circle 5-2 passes through all of the permanent magnets 2. The inner circle 5-1 and the outer circle 5-2 are concentric. At lease two of the permanent magnets 2 are at different distances to a center of the inner circle 5-1.

The irregular distance manner is as follows. A distance between each two neighboring permanent magnets 2 is defined as a permanent magnet distance 7. At least two of the permanent magnet distances 7 are different.

At a surface of the rotary wheel 1 which is approximate to the hollow ring 41, each two neighboring permanent magnets 2 have opposite magnetic poles. All the permanent magnets 2 on the rotary wheel 1 with the first ring-shaped groove have the magnetic poles thereof arranged in an order of N pole, S pole, N pole, S pole, N pole, S pole, etc. At least two of the permanent magnets 2 have different magnetic fluxes.

The Hall component 3 is mounted within the hollow ring 41 on the static wheel 40 with the second ring-shaped groove. The Hall component 3 approximates to the permanent magnets 2 and is positioned for sensing the magnetic flux of each permanent magnet 2. The Hall component 3 is at certain distances to the permanent magnets 2. The Hall component 3 is for generating the rectangular wave signal as the output according to the opposite magnetic poles.

(2) The power assistance model processor 21 is a signal form converter for converting a digital signal about a rotation of the rotary wheel 1 into a power assistance model digital signal.

The power assistance model processor 21 comprises an identifier 22 for identifying an analog/digital conversion, a wave width and a wave peak, a power assistance origin selector 23, a magnet rotation velocity calculator 24, a power assistance model memory 25 and a power assistance model calculator 26.

The identifier 22 is connected to the sensing element. The identifier 22 identifies a width and a peak of each rectangular wave of the rectangular wave signal which is outputted by the Hall component 3 in the sensing element, converts each rectangular wave into respective digital signals and marks each rectangular wave. The identifier 22 outputs a magnet motion digital signal which is marked with magnet position order.

The identifier 22 is connected respectively to the power assistance origin selector 23 and the magnet rotation velocity calculator 24. The power assistance origin selector 23 is connected to the magnet rotation velocity calculator 24. The magnet rotation velocity calculator 24 receives the magnet motion digital signal which is marked with the magnet position order, outputted by the identifier 22, and calculates out a rotation velocity of the rotary wheel 1 with the received magnet motion digital signal; then, the magnet rotation velocity calculator 24 sends a rotation velocity digital signal of the rotary wheel 1 into the power assistance origin selector 23. With the magnet motion digital signal which is marked with the magnet position order and the rotation velocity digital signal of the rotary wheel 1, the power assistance origin selector 23 determines the rectangular wave which corresponds to a power assistance origin under a certain rotation velocity, namely a power assistance origin magnet.

The power assistance origin selector 23 and the magnet rotation velocity calculator 24 are both connected to the power assistance model calculator 26. The power assistance model memory 25 is connected to the power assistance model calculator 26. With the power assistance origin magnet determined by the power assistance origin selector 23 and the rotation velocity of the rotary wheel 1 calculated by the magnet rotation velocity calculator 24, the power assistance model calculator 26 selects out a power assistance model within the power assistance model memory 25, substitutes the power assistance origin magnet and the rotation velocity of the rotary wheel 1 into the selected power assistance model, and calculates out the power assistance model digital signal corresponding to the substituted power assistance origin magnet and the substituted rotation velocity of the rotary wheel 1. The power assistance model calculator 26 outputs the power assistance model digital signal.

(3) The DAC 27 is for converting the power assistance model digital signal into an analog signal of the power assistance model.

The power assistance model calculator 26 is connected to the DAC 27. The DAC 27 converts the power assistance model digital signal of the power assistance model calculator 26 into the analog signal of the power assistance model.

(4) The OPA 28 is for converting the analog signals of the power assistance model of the DAC 27 into analog signals of the power assistance model under a rated voltage range.

The sensor is connected to the electric power-assisted bicycle as follows. The rotary wheel 1 with the first ring-shaped groove of the sensor and the static wheel 40 with the second ring-shaped groove of the sensor are sleeved around the middle shaft 51 of the electric power-assisted bicycle. The static wheel 40 is fixedly connected to the sleeve pipe 52 around the middle shaft 51. The rotary wheel 1 is fixedly connected to the middle shaft 51 of the electric power-assisted bicycle. The rotary wheel 1 synchronously rotates with the middle shaft 51. The rotary wheel 1 and the static wheel 40 are mutually sleeved and embedded for a rotatable connection. The rotary wheel 1 and the middle shaft 51 have the same rotation center. A signal output wire of the OPA 28 of the sensor is connected to a signal input terminal of the motor controller 29 of the electric power-assisted bicycle.

Firstly, the sensor has the following working principles. In order to facilitate illustrating structural relationships and functions of each part of the sensor, the working principles of the sensor are divided into two aspects, obtaining signal and processing signal. Obtaining signal is executed by the rotary wheel 1 with the first ring-shaped groove, the static wheel 40 with the second ring-shaped groove, the permanent magnets 2 and the Hall component 3 of the sensing element. Processing signal is executed by the power assistance model processor 21, the DAC 27 and the OPA 28 which three are connected successively, for processing the signal outputted by the Hall component 3 into the analog signals of the power assistance model acceptable for the motor controller 29.

(1) Illustration about Sensing Element

The rotary wheel 1 with the first ring-shaped groove and the static wheel 40 with the second ring-shaped groove are mutually embedded and also able to rotate relative to each other, in such a manner that the signal outputted by the Hall component 3 is only related to rotations of all the permanent magnets 2, without any relation to the rotary wheel 1 and the static wheel 40, when a motion state of the rotary wheel 1 and sensing positions, between the Hall component 3 and all the permanent magnets 2, maintain unchanged. The rotary wheel 1 and the static wheel 40 made of metal is able to shield. Thus, the Hall component 3 and all the permanent magnets 2 are provided within the hollow ring 41 by the rotary wheel 1 and the static wheel 40 for sensing, which improves reliability and authenticity of the signal of the Hall component 3.

When the static wheel 40 is fixed, by rotating the rotary wheel 1 so that each permanent magnet 2 on the rotary wheel 1 sweeps over the Hall component 3 on the static wheel 40, each permanent magnet 2 is able to induce the Hall component 3 to generate an electric signal. Since the magnetic poles of each two neighboring permanent magnets 2 are opposite, namely all the permanent magnets 2 have the magnetic poles thereof arranged in the alternation order, between south poles and north poles, against the Hall component 3, the electric signal generated by the Hall component is the rectangular wave signal. The rectangular wave signal facilitates the digitization for a digital control. As a contrast, in the conventional technologies, the same magnetic poles of all permanent magnets are provided against the Hall component so that the Hall component is only able to generate the sine wave signal, for an analog control; upon any change in the sensing parameters of the Hall component, the analog control may distort. The present invention avoids a control distortion by accomplishing the digital control via the rectangular wave signal.

The rotary wheel 1 is made of hardly-deformed material plates, such as plastic plates, high-strength insulation plates, copper plates and aluminum plates. When the sensing element is operating, the rotary wheel 1 with the first ring-shaped groove is rotating, so the rotary wheel 1 with the first ring-shaped groove can be directly abbreviated into the rotary wheel 1. A rotation center of the rotary wheel 1 is a center of the ring where the plurality of the permanent magnets 2 is arranged.

The plurality of the permanent magnets 2 is arranged within the ring 6, in such a manner that only one Hall component 3 is sufficient to sense the motion states of all the permanent magnets 2 on the rotary wheel 4, wherein the Hall component 3 is able to sense the motion state, the velocity and a change in the velocity (i.e., an acceleration) of each permanent magnet 2 on the rotary wheel. The Hall component 3 expresses the motion states of the permanent magnets 2 with a continuous electric signal; since all the permanent magnets 2 are respectively mounted on the rotary wheel 1, the continuous electric signal generated by the Hall component 3 is also able to express the motion state of the rotary wheel 1. If the continuous electric signal is further for controlling, then the continuous electric signal becomes a control signal. If the continuous electric signal is further for controlling the motor of the power-assisted bicycle, a single-chip microcomputer or other electronic element is required as a sensing signal processor for converting factors about the position, the velocity and the acceleration in the control signal into a power assistance signal which indicates how much power assistance is demanded. Therein, a function of the converting is the power assistance demand model, or a power assistance model.

Due to the irregular manner in which the plurality of the permanent magnets 2 is arranged, with respect to the electric signal generated by the Hall component 2, the Hall component 2 generates pulse signals having different pulse widths, rather than totally identical pulse signals. Different positions of the permanent magnets 2 are differentiated with the different pulse signals, so as to obtain the motion states of the permanent magnets 2 at the different positions, and to accurately express a specific position of the rotary wheel with the first ring-shaped groove, or the motion state of each permanent magnet 2. The power-assisted bicycle applied with the irregular manner is able to accurately express the power assistance demand of the pedals at different positions, improves an accuracy of expressing the power assistance demand, and accomplishes a better man-machine match.

In the irregular radius manner in which the plurality of the permanent magnets 2 is arranged, some of the permanent magnets 2 are approximate to the rotation center of the rotary wheel while some of the permanent magnets 2 are distal to the rotation center of the rotary wheel. No matter being approximate or distal, all the permanent magnets 2 are within the induction range of the Hall component 3, wherein within the induction range the Hall component 3 is able to generate the electric signal, namely between the inner circle 5-1 and the outer circle 5-2. In order to ensure that the Hall component 3 is able to generate the electric signal, structurally speaking, at least one circle between the inner circle 5-1 and the outer circle 5-2 pass through all the permanent magnets 2. At least two of the permanent magnets 2 are at different distances to the center of the inner circle 5-1. Certainly, it can be embodied that each permanent magnet 2 is at a different distance to the center of the inner circle 5-1; in other words, each permanent magnet 2 is provided at a different radius, in such a manner that each pulse of the electric signal of the Hall component 3 expresses the permanent magnet 2 and the position of the rotary wheel with the first ring-shaped groove.

In the irregular distance manner in which the plurality of the permanent magnets 2 is arranged, at least two permanent magnet distances 7 are different, wherein the distances are measured upon outer edges of the permanent magnets 2. Certainly, it can be embodied that each permanent magnet distance 7 is different, in such a manner that each pulse of the electric signal of the Hall component 3 express the permanent magnet 2 and the position of the rotary wheel with the first ring-shaped groove.

Due to the different magnetic fluxes of the permanent magnets 2, with respect to the electric signal generated by the Hall component 3, the Hall component 3 generates pulse signals with different peal-valley differences, rather than totally identical pulse signals. Different positions of the permanent magnets 2 are differentiated with the different pulse signals, so as to obtain the motion states of the permanent magnets 2 at the different positions, and to accurately express a specific position of the rotary wheel with the first ring-shaped groove, or the motion state of each permanent magnet 2. The power-assisted bicycle applied with the different magnetic fluxes of the permanent magnets 2 is able to accurately express the power assistance demand of the pedals at different positions, improves an accuracy of expressing the power assistance demand, and accomplishes a better man-machine match.

The permanent magnets 2 have different magnetic fluxes, namely the magnetic flux of each permanent magnet 2 varies within a magnetic flux range which the Hall component 3 at the fixed position is able to sense. A maximum and a minimum of the magnetic flux of each permanent magnet 2 is within the magnetic flux range which is Hall component 3 is able to sense.

The Hall component 3 is provided in proximity to all the permanent magnets 2 and able to sense the magnetic fluxes of the permanent magnets 2, in such a manner that the Hall component 3 is for sensing the motion states of the permanent magnets 2. Thus, the Hall component 3 is further able to sense the motion state of the rotary wheel 1 with the first ring-shaped groove, comprising the position, the velocity and the acceleration.

It is an important technical feature that the magnetic poles of each two neighboring permanent magnets 2 are opposite. The magnetic pole of all the permanent magnets are arranged as N pole, S pole, N pole, S pole, N pole, S pole, etc. As a result, the Hall component 3 outputs the rectangular wave signal which is high and low alternatively. Since a size of the rotary wheel with the first ring-shaped groove is restricted, it is preferred for the rotary wheel to generate more accurately varying signals after rotating one circle; and thus the rectangular wave signal is preferred. The peak-valley values of the rectangular wave signal change in a short time, and thus the rectangular wave signal is able to generate possibly many effective control signals within a certain period. In the present invention, the opposite magnetic poles of each two neighboring permanent magnets 2 leads to the rectangular wave; whereas, in the conventional technologies, the same magnetic poles of each two neighboring permanent magnets leads to the sine wave. Especially when the magnetic pole arrangement is applied in the power-assisted bicycle, a diameter of the rotary wheel with the ring-shaped groove of the sensing element is usually restricted between 10 cm and 15 cm; the rectangular wave provides pulses 7-9 times more than the sine wave, when the rotary wheel rotates one circle to obtain the effective control signals. The opposite magnetic poles of each two neighboring permanent magnets 2 are so arranged as to enhance the control over the power-assisted bicycle, improve the man-machine match and increase a comfort for riders.

(2) Illustration about Power Assistance Model Processor 21

The power assistance model processor 21 is the signal form converter for converting the digital signal about the rotation of the rotary wheel 1 into the power assistance model digital signal.

The power assistance model processor 21 comprises the identifier 22 for identifying the analog/digital conversion, the wave width and the wave peak, the power assistance origin selector 23, the magnet rotation velocity calculator 24, the power assistance model memory 25 and the power assistance model calculator 26. The rectangular wave signal of the Hall component 3 of the sensing element is decomposed to obtain a position digital signal which represents the positions of the permanent magnets 2 and a velocity digital signal which represents the rotation velocity of the rotary wheel 1. Because the positions and the velocity are represented by the digital signals, the positions and the velocity can be processed with the power assistance mathematics model. The power assistance mathematics model is designed based on an ideal experience of the rider, so that the power assistance model digital signal outputted by the power assistance model processor 21 corresponds to an optimized power assistance mathematics model. The optimized power assistance mathematics model has an origin and an end; with the position digital signal of the permanent magnets 2, the origin and the end can be as accurate as completely synchronous with the power assistance demand of the rider. As a contrast, in the conventional technologies, the power assistance demand of the rider is mismatched with the power assistance model, and the power assistance model runs later than the power assistance demand, due to an absence of the position signal of the permanent magnets. The present invention avoids the man-machine mis-match and provides the power assistance timely and sufficiently. The power assistance model processor 21 has the following connections and functions.

The identifier 22 is connected to the sensing element. The Hall component 3 of the sensing element outputs the rectangular wave signal into the identifier 22. The identifier 22 identifies the width and the peak of each rectangular wave of the rectangular wave signal, converts each rectangular wave into the respective digital signals and marks each rectangular wave. The identifier 22 outputs the rectangular wave signal which is marked with the magnet position order. As a result, the rectangular wave signal whose waves have different widths and peaks is converted into the rectangular wave signal which is marked with data, so as to facilitate the subsequent digitization for calculating and processing the position data of the rectangular waves converted from the widths and the peaks of the rectangular waves. Therefore, the identifier 22 is a processor for converting the signal whose widths and peaks represent the positions of the permanent magnets, into the digital signal whose data mark the positions of the permanent magnet. The present invention greatly differs from the conventional technologies in the digital signal whose data mark the positions of the permanent magnets. In the present invention, when the rotary wheel 1 is repeatedly rotating circumferentially, the position of a specific one or each one of the permanent magnets can be determined to select out the origin and the end of an operation of the motor 30. The operation of the motor 30 comprises generating, increasing, reducing and stopping the power assistance. Correspondingly, the present invention is able to well match the operation of the motor 30 with the power assistance demand. As a contrast, the conventional technologies encounter much man-machine mismatch; the motor may be idle when the power assistance is required and may be still operating when the power assistance is unnecessary, or even cause crash accidents.

The identifier 22 is connected respectively to the power assistance origin selector 23 and the magnet rotation velocity calculator 24. The power assistance origin selector 23 is connected to the magnet rotation velocity calculator 24. The magnet rotation velocity calculator 24 receives the magnet motion digital signal which is marked with the magnet position order, from the identifier 22, and calculates out the rotation velocity of the rotary wheel 1 with the received magnet motion digital signal; then, the magnet rotation velocity calculator 24 sends the rotation velocity digital signal of the rotary wheel 1 into the power assistance origin selector 23. With the magnet motion digital signal which is marked with the magnet position order and the rotation velocity digital signal of the rotary wheel 1, the power assistance origin selector 23 determines the rectangular wave which corresponds to the power assistance origin under a certain rotation velocity, namely the power assistance origin magnet. The determined power assistance origin magnet is the rectangular wave marked with the data, so the power assistance origin magnet only corresponds to one of the permanent magnets 2. Thereby, the power assistance origin selector 23 accomplishes selecting out the position of the permanent magnet 2 as the power assistance origin, and thus the power assistance model for which the motor is launched or stopped is also determined according to the position of the permanent magnet 2. As a result, a synchronous motion of the selected permanent magnet 2 on the rotary wheel 1 is manually controlled; the selected permanent magnet 2 controls the motor 30 to the specific synchronous rotation, so as to accomplish synchronously manually controlling the motor with the accurate origin and the accurate end, without any delay. As a contrast, the conventional technologies fail to determine the synchronous origin and end when the conventional power-assisted bicycle starts and finishes the power assistance, and thus usually encounters the delay in the origin and the end.

The power assistance origin selector 23 and the magnet rotation velocity calculator 24 are both connected to the power assistance model calculator 26. The power assistance model memory 25 is further connected to the power assistance model calculator 26. With the power assistance origin magnet of the power assistance origin selector 23 and the rotation velocity of the rotary wheel 1 calculated by the magnet rotation velocity calculator 24, the power assistance model calculator 26 selects out a power assistance model function stored in the power assistance model memory 25, substitutes the power assistance origin magnet and the rotation velocity of the rotary wheel 1 into the selected power assistance model function, and calculates out the power assistance model digital signal corresponding to the substituted power assistance origin magnet and the substituted rotation velocity of the rotary wheel 1. The power assistance model calculator 26 outputs the power assistance model digital signal.

(3) Illustration about DAC 27

The DAC 27 is for converting the power assistance model digital signal into the analog signals of the power assistance model.

The power assistance model calculator 26 is connected to the DAC 27. The DAC 27 converts the power assistance model digital signal of the power assistance model calculator 26 into the analog signals of the power assistance model. The analog signals of the power assistance model are outputted into the motor controller 29 which is only able to process analog signal.

(4) Illustration about OPA 28

The OPA 28 is for converting the analog signals of the power assistance model of the DAC 27 into the analog signals of the power assistance model under the rated voltage range.

The DAC 27 is connected to the OPA 28. Although the analog signals of the power assistance model of the DAC 27 is able to solve the power assistance model, a voltage of the analog signals still fails to satisfy the motor controller 29; and thus, it is necessary to convert the analog signals of the power assistance model into the analog signals of the power assistance model under the rated voltage range, via the OPA 28, before being outputted into the motor controller 29.

Secondly, the power-assisted bicycle comprising the sensor and the electric power-assisted bicycle is illustrated as follows.

In order to illustrate physical installing, physically speaking, the sensor comprises a mechanical part and a sensing part, so as to illustrate structural relationships between each physical part of the sensor and each physical part of the electric power-assisted bicycle. The mechanical part comprises the rotary wheel 1 with the first ring-shaped groove and the static wheel 40 with the second ring-shaped groove, which two are mutually connected and embedded to form the rotatable connection within the shell having the hollow ring. The sensing part is provided within the hollow ring. The sensing part comprises the plurality of the permanent magnets 2 which are mounted on an inner surface of the rotary wheel 1 within the hollow ring. The plurality of the permanent magnets 2 rotates synchronously with the rotary wheel 1, and further synchronously with the pedals 54, so as to represent a mechanical operation about the power assistance demand of the rider by the plurality of the permanent magnets 2. The sensing element further comprises the Hall component 3, the power assistance model processor 21, the DAC 27 and the OPA 28, which all are mounted on an inner surface of the static wheel 40 within the hollow ring. The static wheel 40 is mounted with the sleeve pipe 52 on a rack of the power-assisted bicycle, in such a manner that the static wheel 40 with the second ring-shaped groove is prevented from rotating with the rotary wheel 1, and that the Hall component 3, the power assistance model processor 21, the DAC 27 and the OPA 28 mounted on the static wheel 40 are also prevented from rotating with the rotary wheel 1. Thereby, despite of only one fixed position, the Hall component 3 is still able to sense the positions of all the permanent magnets 2 during rotation, so as to convert all the mechanical operations about the power assistance demand of the rider into the electric signals. Through the power assistance model processor 21, the DAC 27 and the OPA 28 of the sensing part, the electric signals of the power assistance demand from the Hall component 3 are converted into the electric signals of the power assistance demand for the man-machine match. The OPA 28 sends the electric signals of the power assistance demand for the man-machine match into the motor controller 29; then the motor controller 29 controls the motor 30 to rotate in a manner of man-machine match; and finally the power-assisted bicycle runs according to the power assistance demand of the rider, and accomplishes the man-machine match.

Each signal processing part of the sensor outputs the following signals.

The Hall component 3 outputs the rectangular wave signal;

the power assistance model processor 21 outputs the power assistance model digital signal;

the identifier 22 outputs the magnet motion digital signal which is marked with the magnet position order;

the power assistance origin selector 23 outputs the origin position signal of the determined power assistance origin magnet;

the magnet rotation velocity calculator 24 calculates and outputs the rotation velocity digital signal of the rotary wheel 1 with the first ring-shaped groove;

the power assistance model memory 25 stores a plurality of spare power assistance model functions, and outputs the digital signals of the selected power assistance model function;

the power assistance model calculator 26 calculates and outputs the power assistance model digital signals with the control function;

the DAC 27 outputs the power assistance model analog signals which are converted from the power assistance model digital signals;

the OPA 28 outputs the power assistance model analog signals within the rated voltage range which are converted from the power assistance model digital signals; and a thermo-sensitive resistor R6 ensures that the OPA 28 outputs the power assistance model analog signals within the rated voltage range, namely standard power assistance model analog signals.

The thermo-sensitive resistor R6 overcomes the signal drift in the analog signals of the power assistance model; the thermo-sensitive resistor R6 is connected between an input terminal and an output terminal of the OPA 28.

The Hall component 3, the DAC 27 and the OPA 28 are all semiconductors able to process the analog signals. Signal parameters of the semiconductors are liable to drift due to temperature change; especially in summer and winter, when the power-assisted bicycle is exposed outsides, the temperature change enhances the drift in the signal parameters. Therefore, it is preferable to rectify against the drift in the signals outputted by the OPA 28, so as to obtain the standard power assistance model analog signals free of an impact from the temperature change. With the standard power assistance model analog signals, the motor 30 runs under the control of the motor controller 29, in such a manner that the rider is hardly able to sense the different power assistances in summer and winter.

The power assistance model processor 21 is a single-chip microcomputer 31 which is connected to a clock circuit 32. The single-chip microcomputer 31 executes functions of the identifier 22, the power assistance origin selector 23, the magnet rotation velocity calculator 24, the power assistance model memory 25 and the power assistance model calculator 26. A clock signal from the clock circuit 32 is for differentiating the rectangular wave signal inputted by the Hall component 3; preferably, a length of each clock signal is 0.001 s.

The mechanical part and the sensing part of the sensor are connected as follows. The mechanical part of the sensor comprises the rotary wheel 1 with the first ring-shaped groove and the static wheel 40 with the second ring-shaped groove, embedded with the rotary wheel 1; the sensing part of the sensor comprises the plurality of the permanent magnets 2, the Hall component 3, the single-chip microcomputer 31, the DAC 27 and the OPA 28. Four electronic elements, namely the Hall component 3, the single-chip microcomputer 31, the DAC 27 and the OPA 28 which are connected successively, are provided on a single circuit board 59. The plurality of the permanent magnets 2 are mounted on an inner wall of the rotary wheel 1 within the hollow ring 41; the circuit board 59 is mounted on an inner wall of the static wheel 40 within the hollow ring 41. The Hall component 3 is so positioned on the circuit board 59 as to be able to sense the magnetic flux of each permanent magnet 2 and output the electric signal according to a change in the sensed magnetic flux. The sensing part of the sensor is for sensing. The mechanical part has two functions, firstly for mounting relative positions among each element of the sensing part so that each the element is integrated into a sensing functional assembly, and secondly for mounting the sensing functional assembly onto the electric power-assisted bicycle and sensing the motion states of the electric power-assisted bicycle by the sensing functional assembly. The four successively connected electronic elements, i.e., the Hall component 3, the single-chip microcomputer 31, the DAC 27 and the OPA 28, are provided on the circuit board 59, which contributes to an integration, a modularization and a miniaturization of the four electronic elements, facilitates integrally mounting the four electronic elements on the inner wall of the static wheel 40 with the second ring-shaped groove within the hollow ring 41, and simplifies a manufacture of the sensor.

Preferably, the Hall component 3 is UGN3075; the power assistance model processor 21 is an AT89S52 single-chip microcomputer 31; the DAC 27 is ADC-C8E; the OPA 28 is OF-17F, wherein the thermo-sensitive resistor R6 is connected between pin 2, an input terminal of the OF-17F OPA 28, and pin 6, an output terminal of the OF-17F OPA 28; and the specific connections are as follows.

Pin 3, a signal output terminal of the Hall component 3, is connected to pin 12 INTO (P32) of the single-chip microcomputer 31;

pin 39 P00 of the single-chip microcomputer 31 is connected to pin 12 B8 of the DAC 27;

pin 38 P01 of the single-chip microcomputer 31 is connected to pin 11 B7 of the DAC 27;

pin 37 P02 of the single-chip microcomputer 31 is connected to pin 10 B6 of the DAC 27;

pin 36 P03 of the single-chip microcomputer 31 is connected to pin 9 B5 of the DAC 27;

pin 35 P04 of the single-chip microcomputer 31 is connected to pin 8 B4 of the DAC 27;

pin 34 P05 of the single-chip microcomputer 31 is connected to pin 7 B3 of the DAC 27;

pin 33 P06 of the single-chip microcomputer 31 is connected to pin 6 B2 of the DAC 27;

pin 32 P07 of the single-chip microcomputer 31 is connected to pin 5 B1 of the DAC 27;

pin 4 of the DAC 27 is connected to the pin 2 of the OPA 28;
pin 2 of the DAC 27 is connected to pin 3 of the OPA 28;
and the pin 6 of the OPA 28 is an analog signal output terminal The thermo-sensitive resistor R6 is connected between the pin 2, the input terminal of the OF-17F OPA 28, and the pin 6, the output terminal of the OF-17F OPA 28. A capacitor C6 is connected between two ends of the thermo-sensitive resistor R6 in parallel. Preferably, the thermo-sensitive resistor R6 is 5K; the capacitor C6 is 8P; a resistor R5 of 1.25K, connected between the pin 4 of the DAC 27 and the pin 2 of the OPA 28, is grounded. Therefore, a voltage range of the analog signal outputted by the pin 6 of the OPA 28, adjusted by the thermo-sensitive resistor R6, is stabilized between 0.8V and 4.2V.

Bearings 42 are provided between an outer surface of an inner ring of the static wheel 40 and an inner surface of an inner ring of the rotary wheel 1. Through the bearings 42, the static wheel 40 and the rotary wheel 1 are able to well maintain the relative rotation therebetween for a long time.

An outer surface of the static wheel 40 has a circular depression 58. The circular depression 58 is engaged with the sleeve pipe 52 around the middle shaft 51 of the electric power-assisted bicycle, so as to form a fixed connection by engaging the sleeve pipe 52 within the circular depression 58. It is simple in installing, convenient in cleaning, and beautiful in appearance to engage the sleeve pipe 52 around the middle shaft 51 of the electric power-assisted bicycle with the circular depression 58 of the static wheel 40.

The Hall component 3 is provided between the inner circle 5-1 and the outer circle 5-2. The Hall component 3 is able to sense the magnetic fluxes of the permanent magnets 2 from a certain distance and output the electric signal. It is preferable to reduce a size of each permanent magnet 2 to maximize the number of the permanent magnets 2 on the rotary wheel 1, while ensuring that the Hall component 3 is still able to sense the permanent magnet 2 after being reduced in the size. Therefore, the Hall component 3 is provided between the inner circle 5-1 and the outer circle 5-2, and preferably at the circle passing through all the permanent magnets 2.

The rotary wheel 1 has a central hole within the inner circle 5-1 of the permanent magnets 2. The rotary wheel 1 is intended to engage with and sleeve on a rotation axle, and thus the rotary wheel 1 has a hole for engaging with and sleeving on the rotation axle. In order to ensure that the Hall component 3 is able to sense a motion signal of each permanent magnet 2 on the rotary wheel 1 when the rotary wheel 1 rotates with the rotation axle, the hole for engaging with and sleeving on the rotation axle is required to be at the center of the inner circle 5-1 of the permanent magnets 2. Since the inner circle 5-1 and the outer circle 5-2 are concentric, the hole for engaging with and sleeving on the rotation axle is also at the center of the outer circle 5-2; in other words, the hole for engaging with and sleeving on the rotation axle is at a central position of the inner circle 5-1 and the outer circle 5-2, namely a central hole. The central hole is not limited to round, and can be rectangular or triangle, for engaging with and sleeving on a rectangular or a triangle rotation axle; it is required for the central hole to cover the center of the inner circle 5-1, in order to sense the motion signals of all the permanent magnets 2 on the rotary wheel 1 with the first ring-shaped groove with the only one Hall component 3.

At least one of the permanent magnet distances 7 is unequal to other permanent magnet distances 7; and, at least the magnetic flux of one of the permanent magnets 2 is unequal to the magnetic fluxes of other permanent magnets 2. The unequal permanent magnet distance 7, also defined as a special permanent magnet distance 7, is for representing the position of the pedals. Preferably, two of the permanent magnet distances 7 are unequal to other permanent magnet distance 7 and thus respectively correspond to the two pedals, for representing the positions of the two pedals. Similarly, the unequal magnetic flux, also defined as a special magnetic flux, is for representing the position of the pedals. Preferably, the magnetic fluxes of two of the permanent magnets 2 are unequal to the magnetic fluxes of other permanent magnets 2, and thus the two special magnet fluxes respectively correspond to the two pedals, for representing the positions of the two pedals. It greatly improves accuracy and reliability to represent the position of the pedal with the special permanent magnet distance 7 and the special magnetic flux of the permanent magnet 2. Because of circumferential rotations of the pedals, obtaining the positions of the pedals plays a key role in obtaining a velocity of the circumferential rotation and determining the power assistance model of next circumferential rotation.

The rotary wheel 1 with the first ring-shaped groove is made of one non-permeability magnetic material of plastic plates, aluminum plates and copper plates. According to the present invention, the magnetic poles of each two neighboring permanent magnets 2 are opposite, so the outer edges of the neighboring permanent magnets 2 are almost able to attach to each other and the Hall component 3 is able to output the electric signal with the control function.

The present invention has the following merits. The present invention has a simple structure and low costs; the number of the permanent magnets is beyond restriction; the present invention outputs the standard pulse signal, excluding any signal blind zone; all motion states of the rotary wheel is completely represented by a group of output signals of the only one Hall component, avoiding the distortion and the drift in the outputted signals; the fixed position of the pedals are represented by the position change and the magnetic flux change; the output signal contains the motion position of each permanent magnet. The above merits of the power-assisted bicycle of the present invention ensures the well match between the power assistance output and the power assistance demand, so as to bring great comfort to the rider.

(1) The sensor of the present invention has a simple structure, excludes elastic element and avoids mechanical failure. The Hall component is for sensing the rotation of the permanent magnets to output the signals. According to the principles, disclosed in the Chinese patent with the application number of CN01201843.0, of speculating the moment with the velocity, the various mathematics models can be used for speculating the parameters of the moment of the power-assisted bicycle, so as to control the motor of the power-assisted bicycle and provides the power assistance. Without the elastic element, the present invention has a simpler structure and lower costs than a conventional sensor with the elastic element and the mechanical stress. The present invention prevents each mechanical part from deformation, and avoids the mechanical failure and poor match, after the long-time service.

(2) With the opposite magnetic poles of each two neighboring permanent magnets, the outputted rectangular wave signal is able to accurately control. The magnetic poles of each two neighboring permanent magnets are opposite, and the Hall component generates the rectangular wave as the output signal in accordance to the opposite magnetic poles. Therefore, no matter how big the distance between the two neighboring permanent magnets is, and even with no distance between the two neighboring permanent magnets, the Hall component is still able to output the rectangular wave signal. For the power-assisted bicycle, it is more preferred to control the motor of the power-assisted bicycle by the rectangular wave output signal than by the sine wave output signal. Compared with the sine wave, the rectangular wave is able to accurately express the motion position and the velocity through the signal at any time, and thus able to accurately express the motion positions and the velocities of the pedals, so as to facilitate speculating out a proper power assistance for the motion states with the accurate positions and the accurate velocities of the pedals.

(3) The magnetic poles of each two neighboring permanent magnets are opposite, the number of the permanent magnets is beyond restriction, and thus the induction points can be added as many as possible. Due to the opposite magnetic poles, the rectangular wave signal is outputted; even with no distance between the neighboring permanent magnets, the outputted signal is still the rectangular wave signal which has a specific number and is distinguishable, and is still able to control. In other words, it is avoided to output a constant line signal which is unable to control. For the power-assisted bicycle of the present invention, the rotary wheel linked with the pedals has the diameter restricted, so on the rotary wheel with the determined diameter it is preferred to increase the number of the permanent magnets, the number of the induction points, and the number of the sensing signals for expressing the motion position and velocity of the pedals, so as to accurately express the motion states.

(4) The opposite magnetic poles of each two neighboring permanent magnets permit increasing the permanent magnets and the induction points, so as to accurately express the motion states of the rotary wheel. For the power-assisted bicycle of the present invention, the size of the rotary wheel where the permanent magnets are mounted is strictly restricted, wherein the diameter of the rotary wheel is usually 10-15 cm. In order to obtain a magnetic pole signal of the permanent magnets by the Hall component from the certain distance, a diameter of each permanent magnet is at least Φ0.6-0.8 cm. For the rotary wheel with the diameter of 10-15 cm, 35-73 permanent magnets can be provided on the rotary wheel [(10−1)*3.14/0.8=35; (15−1)*3.14/0.6=73]. When the pedal rotates one circle, the Hall component obtains 35-73 signals for controlling the motor of the power-assisted bicycle. As a contrast, if the magnet poles of the two neighboring permanent magnets are identical, given that the neighboring permanent magnets are provided at a distance of 5 cm, at most 5-8 permanent magnets can be mounted on the rotary wheel with the diameter of 10-15 cm [(10−1)*3.14/5.8=5; (15−1)*3.14/5.6=8]. As a conclusion, the present invention provided the permanent magnets 7-9 times more than the conventional technologies (35/5=6; 73/8=9), specifically 30-65 more than the conventional technologies (35−5=30; 73−8=65). When the rotary wheel rotates one circle, the present invention obtains the induction point signals of the rotation of the rotary wheel 7-9 times more than the conventional technologies. Correspondingly, the present invention improves the control accuracy over the motor of the power-assisted bicycle by 7-9 times, increases the accuracy of the power assistance demand of the rider by 7-9 times, strengthens the man-machine match, and greatly improves the comfort of the rider by avoiding an uncomfortable sudden acceleration and deceleration of the conventional technologies. According to practice and reality experience, when 15 permanent magnets are substantially uniformly provided on the rotary wheel with the first ring-shaped groove, the uncomfortable sudden acceleration and deceleration, occurred in the conventional technologies, are basically eliminated; when 20 permanent magnets are substantially uniformly provided on the rotary wheel with the first ring-shaped groove, the man-machine match is satisfactory, and the riders feel very comfortable.

(5) Without any signal blind zone, the power assistance demand at any time obtains corresponding power assistance. According to the present invention, at most 35-73 permanent magnets are provided on the rotary wheel with the diameter of 10-15 cm; and an averaged angle between each two neighboring magnets is 5°-10°. When the power-assisted bicycle is launching or operating, there are 4-7 permanent magnets within a range of 35°, from 10° to 45° by the pedal away from the top, wherein one of the signals is outputted when the pedal gets away from the top by 10°, and then the Hall component outputs 4-7 control signals corresponding to the power assistance demand, which accomplishes obtaining corresponding power assistance in accordance to the power assistance demand at any position and at any time, accomplishes the well man-machine match, saves labor and brings comfort to the rider.

(6) All motion states of the rotary wheel with the first ring-shaped groove are represented by the control signal with the only one Hall component. The control signal completely corresponds to the motion states of the rotary wheel; the control signal completely corresponds to the power assistance demand of the rider. The plurality of the permanent magnets is mounted on the rotary wheel; the permanent magnets synchronously rotate with the rotary wheel. The motion signals of all the permanent magnets are sensed by the only one Hall component. The control signal outputted by the Hall component completely corresponds to the motion states of the rotary wheel, and also to the power assistance demand of the rider, so as to avoid the original segmental error and the drift in the control signal. Even if the sensing parameters of the Hall component change, the whole sensing signal moves in parallel; as long as the motor controller which receives the control signal from the Hall component has a relatively wide receipt range, the control effect of the changed control signal from the Hall component changes systematically. For the power-assisted bicycle of the present invention, the power assistance demand model is prevented from distortion; the power assistance output and the power assistance demand still maintain the match originated from the power assistance demand model; and it is very easy for the rider to master the systematical change in the power assistance performance (7) The permanent magnets are provided in the irregular manner with the change in the magnetic flux, so as to reliably represent the motion state at a specific induction point. The permanent magnets are provided in the irregular radius manner or in the irregular distance manner, so that the Hall component outputs the wave control signal having a specific wave distance. The magnetic flux of each permanent magnet is variable, so that the Hall component outputs the wave control signal having a specific peak-valley difference. In other words, the motion position of the permanent magnet is represented by the wave distance and the peak-valley difference, in such a manner that the control signal represents the motion state of the permanent magnet at a higher accuracy. When each permanent magnet has a special irregular induction point and a special magnetic flux, in accordance to the number of the permanent magnets, an identical number of motion state signals in two wave change manners are generated. For the power-assisted bicycle of the present invention, the rotary wheel has the diameter of 10-15 cm; when the rotary wheel rotate one circle, the Hall component obtains the motion state control signals in the two wave change manners at 35-73 different induction points, and naturally the power assistance demand at the 35-73 different induction points are obtained. Obviously, in the conventional technologies, after the rotary wheel rotates one circle, at most 5-8 sine waves can be obtained to represent the power assistance demand, far less than the 35-73 power assistance demand signals in the two wave change manners. Therefore, the present invention reflects the power assistance demand of the rider at a higher authenticity, with more information and at a higher reliability, compared with the conventional technologies. In other words, the power-assisted bicycle of the present invention accomplishes a better man-machine match. No matter what position the pedals rotate to, a bicycle velocity is completely under a control of the rider who enjoys a great comfort. In the conventional technologies, the bicycle velocity of the power-assisted bicycle can be controlled merely at the 5-8 rotation positions at most.

(8) The rotary wheel and the static wheel in the relative rotation are integrated into the shell, so as to mount the relative positions between the Hall component and all the permanent magnets, avoid interference from external environment of the shell, improve the reliability and the authenticity of the Hall signal, and facilitate the installing, test and maintenance.

(9) By processing the Hall signal with the digitization, the control model for the optimized man-machine match is added into the control signal. The rectangular wave signal containing the magnet position and the magnet rotation velocity is converted into the position digital signal and the rotation velocity digital signal; with the determined mathematics power assistance model for the well man-machine match, the position digital signal and the rotation velocity digital signal are converted into the power assistance model digital signal; then the power assistance model digital signal is converted into the power assistance model analog signal; and finally, the power assistance model analog signal is converted into the control signal within the stable voltage range acceptable for the motor controller with a rated power. As a conclusion, the signal about the rotation of the magnets is processed with digitization; during the digitization, the mathematics power assistance model is added so that the control signal which the sensor finally outputs contains the added power assistance model. Since the mathematics power assistance model is manually manipulated, the mathematics power assistance model can be set to be a model most suitable for the man-machine match; accordingly, the sensor of the present invention is able to output the control signal for the optimized man-machine match. As a contrast, in the conventional technologies, for the sensor of the power-assisted bicycle, the identical magnetic poles of the permanent magnets are arranged at the same side, which disenables the Hall component to obtain the rectangular wave signal and also disenables the digitization on the Hall signal; the control model is only able to partially modify the Hall signal, and thus the conventional technologies are unable to output the control signal for the optimized man-machine match.

The present invention avoids the signal drift in the control signal finally outputted. With feedback and adjustment upon the output signal of the OPA by the thermo-sensitive resistor R6, the present invention solves the drift in the power assistance model analog signal caused by the semiconductors, comprising the Hall component, the DAC and the OPA. As a result, the sensor finally outputs the standard power assistance model analog signal free from a change in an environmental temperature.

(10) An operation manner in which the motor accomplishes the optimized man-machine match is as follows. The identifier for identifying the analog/digital conversion, the wave width and the wave peak converts each rectangular wave signal into the different digital signals. Then the power assistance origin selector selects out the power assistance mathematics model in the optimized match with the power assistance demand within the power assistance model memory; the magnet rotation velocity calculator gives the velocity. The power assistance model calculator substitutes the selected power assistance mathematics model and the given velocity into the power assistance mathematics model, and then calculates out the power assistance model digital signal of the pedals at a specific position. The power assistance model digital signal is the control signal for optimizing the match between the rider and the electric power-assisted bicycle and controlling the motor. The power assistance model calculator is a digital processor which is able to accept any digital mathematics model, and thus the power assistance model memory is able to provide the power assistance model calculator with an arbitrary manually manipulated mathematics model. With the arbitrary manually manipulated mathematics model, the mathematics model for the optimized match between the rider and the electric power-assisted bicycle falls within the manual manipulation too. The power assistance model memory is manually manipulated to obtain the mathematics model for the optimized match between the rider and the electric power-assisted bicycle, so as to accomplish the operation manner in which the motor accomplishes the optimized man-machine match. The manually manipulated mathematics model also provides the motor with a most reasonable launch and operation model and a most electricity-saving operation manner Therefore, the power-assisted bicycle of the present invention is an electricity-saving power-assisted bicycle with the optimized match between the rider and the electric power-assisted bicycle.

However, in the conventional technologies, within a rotation cycle of the pedals, the Hall component merely outputs less than 10 sine wave signals. The sine wave signals are unable to be converted into the digital signals; and thus the optimized power assistance model is unable to be manually added to control the motor of the electric power-assisted bicycle. The power assistance model of the power assistance bicycle according to the conventional technologies is unable to accomplish the optimized man-machine match and disenables the motor to operate in the most reasonable and most electricity-saving operation manner

(11) The present invention has the following electricity-saving effect and importance. In order to test the electricity-saving, the power-assisted bicycle of the present invention is compared with the power-assisted bicycle having the identical magnetic poles of the 8 permanent magnets at the same side as the sensing part, which is purchased on market. By changing the sensor on the same electric power-assisted bicycle, the test is executed by the same rider on the same road. Results show that after the power-assisted bicycle of the present invention runs 110 km, the battery has residue electricity; and that after the power-assisted bicycle which is purchased on market runs 45 km, the battery runs out of electricity. The importance of the electricity saving of the present invention lies in that a fully charged power-assisted bicycle of the present invention is able to run for a whole day without recharge, avoiding a difficulty in the conventional technologies that the bicycle is no longer able to provide power assistance on the halfway.

These and other objectives, features, and advantages of the present invention will become apparent from the following detailed description, the accompanying drawings, and the appended claims.

BRIEF DESCRIPTION OF THE DRAWINGS

In FIG. 1 different widths of lines of the permanent magnets represent the different magnetic fluxes.

In FIG. 2 the different widths of the lines of the permanent magnets represent the different magnetic fluxes.

1—rotary wheel with first ring-shaped groove; 2—permanent magnets; 3—Hall component; 5-1—inner circle; 5-2—outer circle; 6—ring; 7—permanent magnet distance; 21—power assistance model processor; 22—identifier for identifying analog/digital conversion, wave width and wave peak; 23—power assistance origin selector; 24—magnet rotation velocity calculator; 25—power assistance model memory; 26—power assistance model calculator; 27—DAC; 28—OPA; 29—motor controller; 30—motor; 31—single-chip microcomputer; 32—clock circuit; 40—static wheel with second ring-shaped groove; 41—hollow ring; 42—bearings; 51—middle shaft; 52—sleeve pipe; 53—chain wheel; 54—pedals; 55—battery; 58—circular depression; and 59—circuit board.

DETAILED DESCRIPTION OF THE PREFERRED EMBODIMENT

Figure 1:
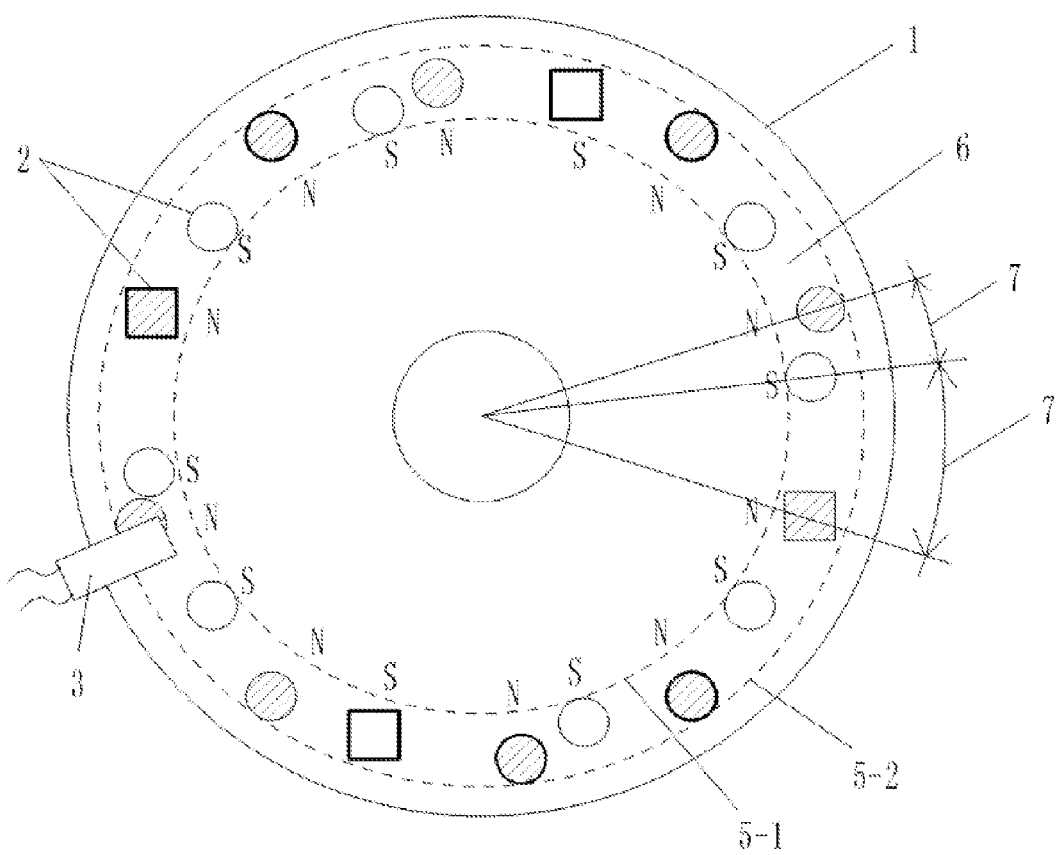
FIG. 1 is a sketch view of a sensing part according to preferred embodiments of the present invention, wherein multiple magnet positions and magnetic fluxes are unevenly distributed on a rotary wheel with a first ring-shaped groove and permanent magnets are arranged in an N-S alternation order.
Figure 3:
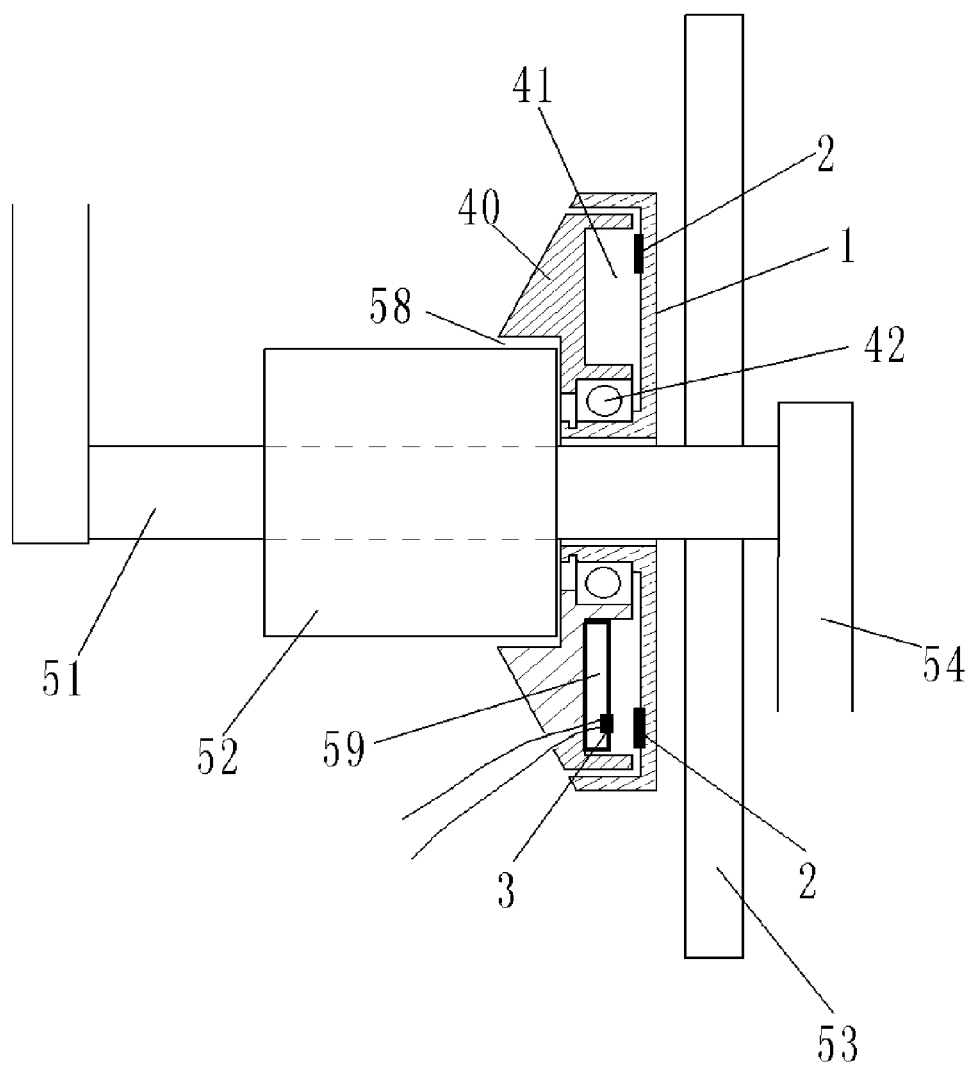
FIG. 3 is a sectional view of a middle shaft and a sleeve pipe of a power-assisted bicycle which are connected to a sensor according to the preferred embodiments of the present invention.
Figure 4:
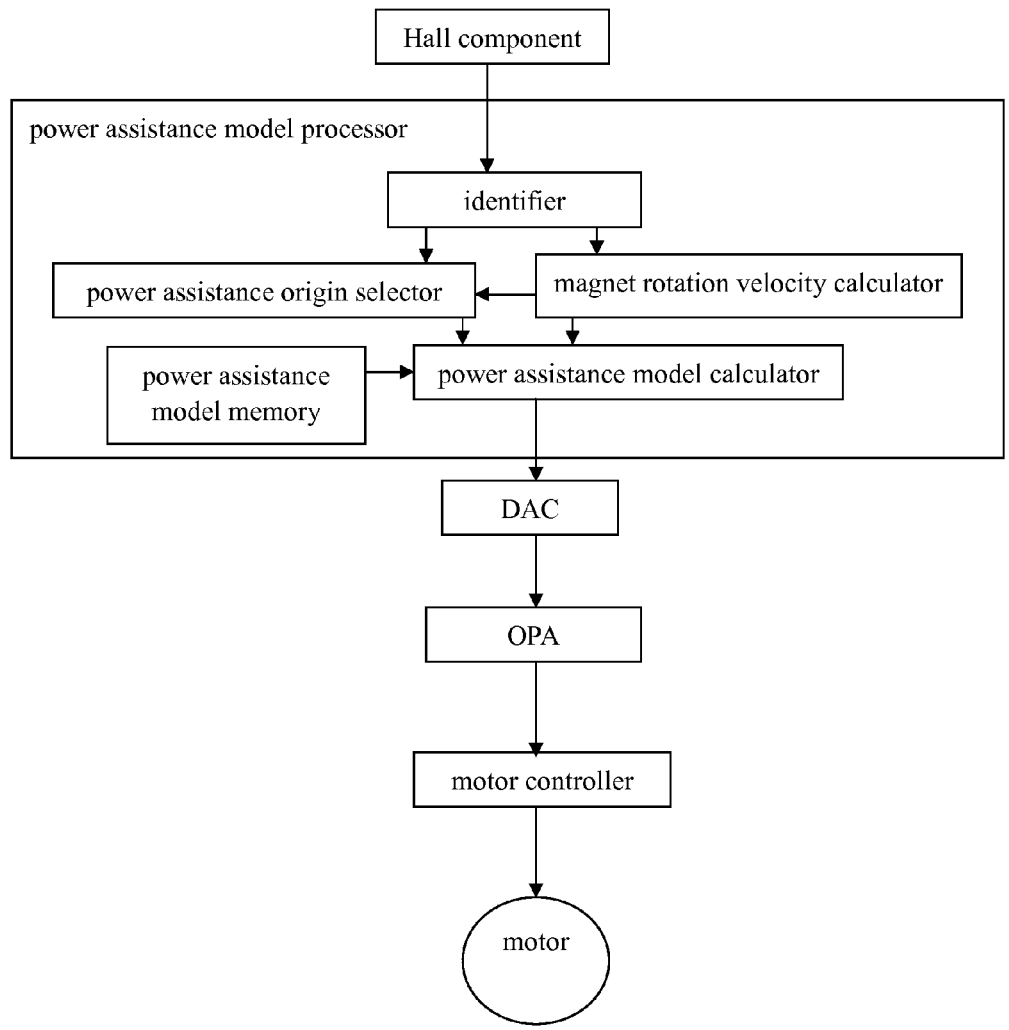
FIG. 4 is a block diagram of a signal flow of a Hall component, a power assistance model processor, a DAC and an OPA according to the preferred embodiments of the present invention.
Figure 6:
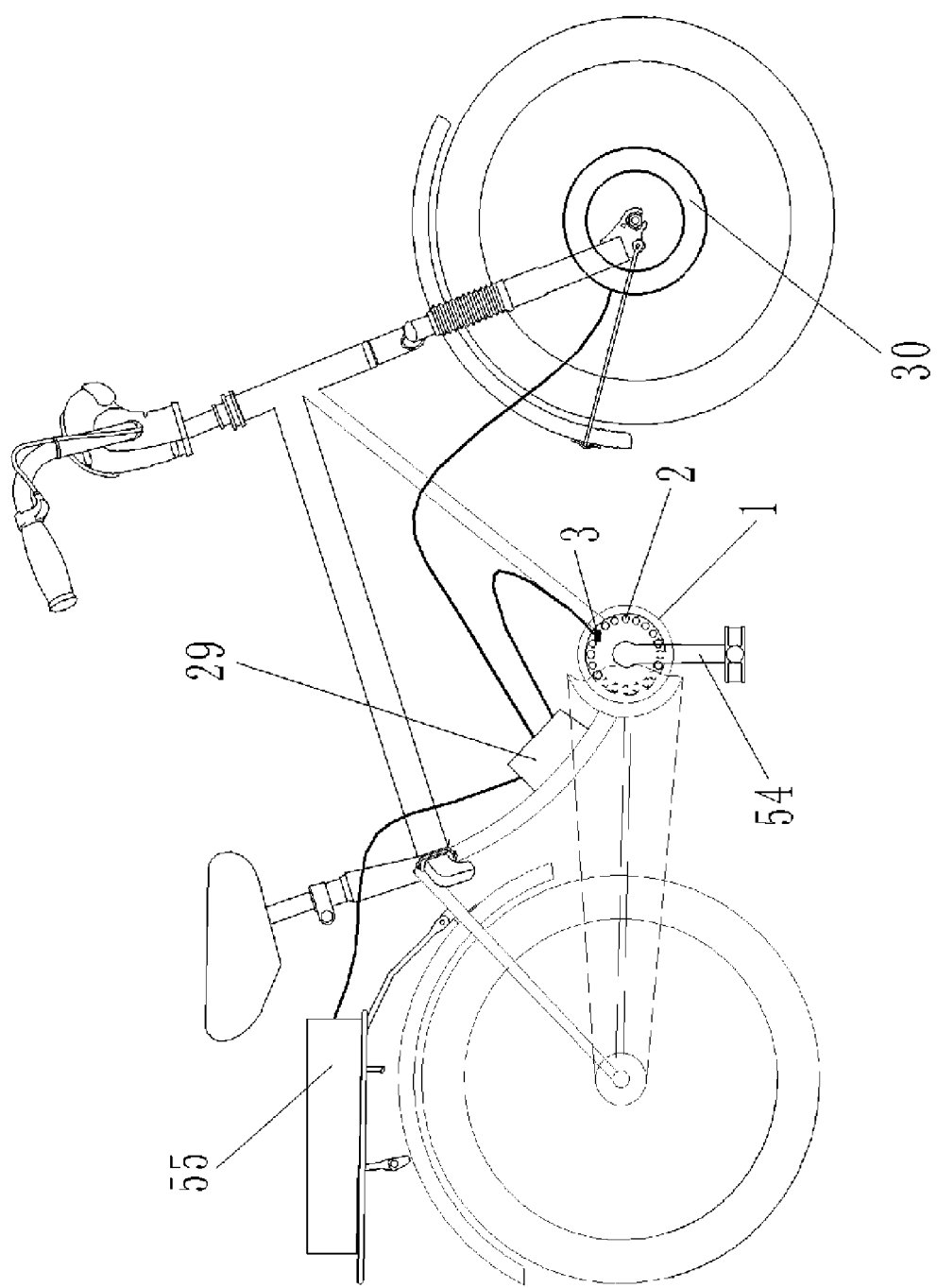
FIG. 6 is a sketch view of the power-assisted bicycle according to the preferred embodiments of the present invention, wherein the sensor is provided on the middle shaft.

First Preferred Embodiment-Power-assisted bicycle having sensor with multiple magnet positions and magnetic fluxes unevenly distributed in shell As showed in FIGS. 1, 3, 4 and 6, according to a first preferred embodiment of the present invention, a sensor of the present invention is mounted on a middle shaft 51 of an electric power-assisted bicycle of conventional technologies; a signal output wire of the sensor is connected to a motor controller 29 of the conventional electric power-assisted bicycle, so as to form a power-assisted bicycle of the present invention.

Firstly, the electric power-assisted bicycle of the conventional technologies has the following parts and connections. The electric power-assisted bicycle has the middle shaft 51. A sleeve pipe 52 is sleeved around an intermediate section of the middle shaft 51. The middle shaft 51 and the sleeve pipe 52 are rotatably connected. A chain wheel 53 is mounted on the middle shaft 51. Two pedals 54 are respectively mounted at two ends of the middle shaft 51. A battery 55 on the power-assisted bicycle and a motor controller 29 are connected; a motor 30 on a wheel is connected to the motor controller 29.

Secondly, the sensor of the present invention has the following structures and connections.

The sensor comprises a sensing element, a power assistance model processor 21, a DAC 27 and an OPA 28 which are connected successively.

(1) The sensing element is for converting a rotary motion of a rotary wheel 1 with a first ring-shaped groove into an output of a rectangular wave signal.

The sensing element comprises the rotary wheel 1 with the first ring-shaped groove and a static wheel 40 with a second ring-shaped groove. The first ring-shaped groove of the rotary wheel 1 is opposed to the second ring-shaped groove of the static wheel 40. The rotary wheel 1 and the static wheel 40 are so sized as to embed the static wheel 40 within the first ring-shaped groove of the rotary wheel 1, so as to form an embedded hollow shell having the two wheels relatively rotatable. Therein, the first ring-shaped groove and the second ring-shaped groove form a hollow ring 41 where a plurality of permanent magnets 2 is mounted on the rotary wheel 1. The rotary wheel 1 with the first ring-shaped groove and the static wheel 40 with the second ring-shaped groove are prepared via injection molding with high-strength plastic.

A surface of the rotary wheel 1 with the first ring-shaped groove, exposed within the hollow ring 41, has a diameter of 10.0 cm. 20 permanent magnets 2 are provided on the rotary wheel 1 with the first ring-shaped groove. Each permanent magnet 2 has a diameter of 0.8 cm, and a magnetic flux within a range of $146\text{-}279(B\cdot H)max/KJ\cdot m^{-3}$, wherein each two neighboring permanent magnets 2 have different magnetic fluxes. The rotary wheel 1, the permanent magnets 2 and a Hall component 3 respectively have the following structures.

Each permanent magnet 2 is mounted within a ring 6 formed by an inner circle 5-1 having a diameter of 8.5 cm and an outer circle 5-2 having a diameter of 9.5 cm. The permanent magnets are arranged respectively in an irregular radius manner and in an irregular distance manner.

The irregular radius manner is as follows. The plurality of the permanent magnets 2 are arranged within the ring 6 formed by the inner circle 5-1 and the outer circle 5-2. At least one circle between the inner circle 5-1 and the outer circle 5-2 passes through all of the permanent magnets 2. The inner circle 5-1 and the outer circle 5-2 are concentric. At lease two of the permanent magnets 2 are at different distances to a center of the inner circle 5-1.

The irregular distance manner is as follows. A distance between each two neighboring permanent magnets 2 is defined as a permanent magnet distance 7. At least two of the permanent magnet distances 7 are different.

Two of the permanent magnet distances 7 are unequal to other permanent magnet distances 7. Furthermore, the two permanent magnet distances 7 are different with each other. Positions of the two permanent magnets 2 where the two permanent magnet distances 7 are located are exactly two ends of the diameter of the rotary wheel 1, wherein the magnetic fluxes of the two permanent magnets 2 are unequal to the magnetic flux of any other permanent magnet 2 and also different with each other. The two permanent magnets 2 are for representing motion positions of the two pedals of the power-assisted bicycle.

For all of the permanent magnets 2 provided at one side of the rotary wheel 1, magnetic poles of each two neighboring permanent magnets 2 are opposite with each other. In other words, all the permanent magnets 2 at the side of the rotary wheel 1 have the magnetic poles thereof arranged in an order of N pole, S pole, N pole, S pole, N pole, S pole, etc.

The Hall component 3 is mounted on the static wheel 40 with the second ring-shaped groove within the hollow ring 41. A signal output wire of the Hall component 3 penetrates through the static wheel 40. The Hall component 3 is provided in proximity to the permanent magnets 2, namely the Hall component 3 is provided within the ring 6 between the inner circle 5-1 and the outer circle 5-2 where each permanent magnet 2 is located. The Hall component 3 is spaced from each permanent magnet 2 at a rotating state by 0.3 cm, in such a manner that the Hall component 3 generates and outputs a corresponding rectangular wave electric signal when each permanent magnet 2 at the rotating state passes by the Hall component 3.

The rotary wheel 1 has a central hole at a center of the inner circle 5-1 of all the permanent magnets 2, for sleeving on the middle shaft 51.

(2) The power assistance model processor 21 is a converter for converting a digital signal of a rotation of the rotary wheel 1 into a power assistance model digital signal.

The power assistance model processor 21 comprises an identifier 22 for identifying an analog/digital conversion, a wave width and a wave peak, a power assistance origin selector 23, a magnet rotation velocity calculator 24, a power assistance model memory 25 and a power assistance model calculator 26.

The identifier 22 is connected to the sensing element. The identifier 22 identifies a width and a peak of each rectangular wave of the rectangular wave signal which is outputted by the Hall component 3 in the sensing element, converts each rectangular wave into respective digital signals and marks each rectangular wave. The identifier 22 outputs a magnet motion digital signal which is marked with magnet position order.

The identifier 22 is connected respectively to the power assistance origin selector 23 and the magnet rotation velocity calculator 24. The power assistance origin selector 23 is connected to the magnet rotation velocity calculator 24. The magnet rotation velocity calculator 24 receives the magnet motion digital signal which is marked with the magnet position order, outputted by the identifier 22, and calculates out a rotation velocity of the rotary wheel 1 with the received magnet motion digital signal; then, the magnet rotation velocity calculator 24 sends a digital signal of the rotation velocity of the rotary wheel 1 into the power assistance origin selector 23. With the magnet motion digital signal which is marked with the magnet position order and the digital signal of the rotation velocity of the rotary wheel 1, the power assistance origin selector 23 determines the rectangular wave which corresponds to a power assistance origin under a certain rotation velocity, namely a power assistance origin magnet. The power assistance origin selector 23 determines the power assistance origin magnet, which is equal to that the power assistance origin selector 23 determines which rectangular wave to start providing the power assistance. Specifically speaking, the power assistance origin selector 23 determines from which magnet at which position to start providing the power assistance, or to start changing an original power assistance model into a selected next power assistance model, at a specific rotation velocity of the rotary wheel 1.

The power assistance origin selector 23 and the magnet rotation velocity calculator 24 are both connected to the power assistance model calculator 26. The power assistance model memory 25 is connected to the power assistance model calculator 26. With the power assistance origin magnet determined by the power assistance origin selector 23 and the rotation velocity of the rotary wheel 1 calculated by the magnet rotation velocity calculator 24, the power assistance model calculator 26 selects out the power assistance model from the power assistance model memory 25, substitutes the power assistance origin magnet and the rotation velocity of the rotary wheel 1 into the selected power assistance model, and calculates out the power assistance model digital signal corresponding to the substituted power assistance origin magnet and the substituted rotation velocity of the rotary wheel 1. The power assistance model calculator 26 outputs the power assistance model digital signal.

(3) The DAC 27 is for converting the power assistance model digital signal into analog signals of the power assistance model.

The power assistance model calculator 26 is connected to the DAC 27. The DAC 27 converts the power assistance model digital signal of the power assistance model calculator 26 into the analog signals of the power assistance model.

(4) The OPA 28 is for converting the analog signals of the power assistance model of the DAC 27 into analog signals of the power assistance model under a rated voltage range.

The DAC 27 is connected to the OPA 28. Although the analog signals of the power assistance model of the DAC 27 is able to solve the power assistance model, a voltage of the analog signals still fails to satisfy the motor controller 29; and thus, it is necessary to convert the analog signals of the power assistance model into the analog signals of the power assistance model under the rated voltage range, via the OPA 28, before being outputted into the motor controller 29.

Thirdly, the sensor of the present invention and the electric power-assisted bicycle of the conventional technologies are connected to form the power-assisted bicycle of the present invention. The rotary wheel 1 and the static wheel 40 of the sensor are sleeved onto the middle shaft 51 of the electric power-assisted bicycle. The static wheel 40 is mounted on the sleeve pipe 52 around the middle shaft 51. The rotary wheel 1 of the sensor is mounted on the middle shaft 51 of the electric power-assisted bicycle. The rotary wheel 1 synchronously rotates with the middle shaft 51. The rotary wheel 1 and the static wheel 40 are mutually sleeved and embedded for a rotatable connection. The rotary wheel 1 and the middle shaft 51 have the same rotation center. A signal output wire of the OPA 28 of the sensor is connected to a signal input terminal of the motor controller 29 of the electric power-assisted bicycle. Thereby, the permanent magnets 2 on the rotary wheel 1 synchronously rotate with the middle shaft 51, and further with the two pedals 54 by the same rotation angle at the same rotation velocity. The Hall component 3 on the static wheel 40 senses the rotation of the permanent magnets 2 to sense the rotation angle and the rotation velocity of the two pedals 54. Position and velocity electric signals of the sensed rotation of the permanent magnets 2 which represent the rotation of the pedals 54 are sent by the Hall component 3 into the power assistance model processor 21, the DAC 27 and the OPA 28 59 which three are provided on a circuit board 59, for signal processing. The OPA 28 is connected to the motor controller 29 of the electric power-assisted bicycle, for controlling the electric power-assisted bicycle with the electric signals by the sensor. In other words, the power-assisted bicycle of the present invention has the electric power-assisted bicycle controlled by the power assistance model analog signals of the OPA 28, i.e., standard power assistance model analog signals.

The power assistance model analog signals outputted by the OPA 28 are signals capable of matching a motion of the motor 30 of the power-assisted bicycle with a power assistance demand of a rider. Therefore, according the first preferred embodiment of the present invention, the power-assisted bicycle accomplishes man-machine match.

Figure 2:
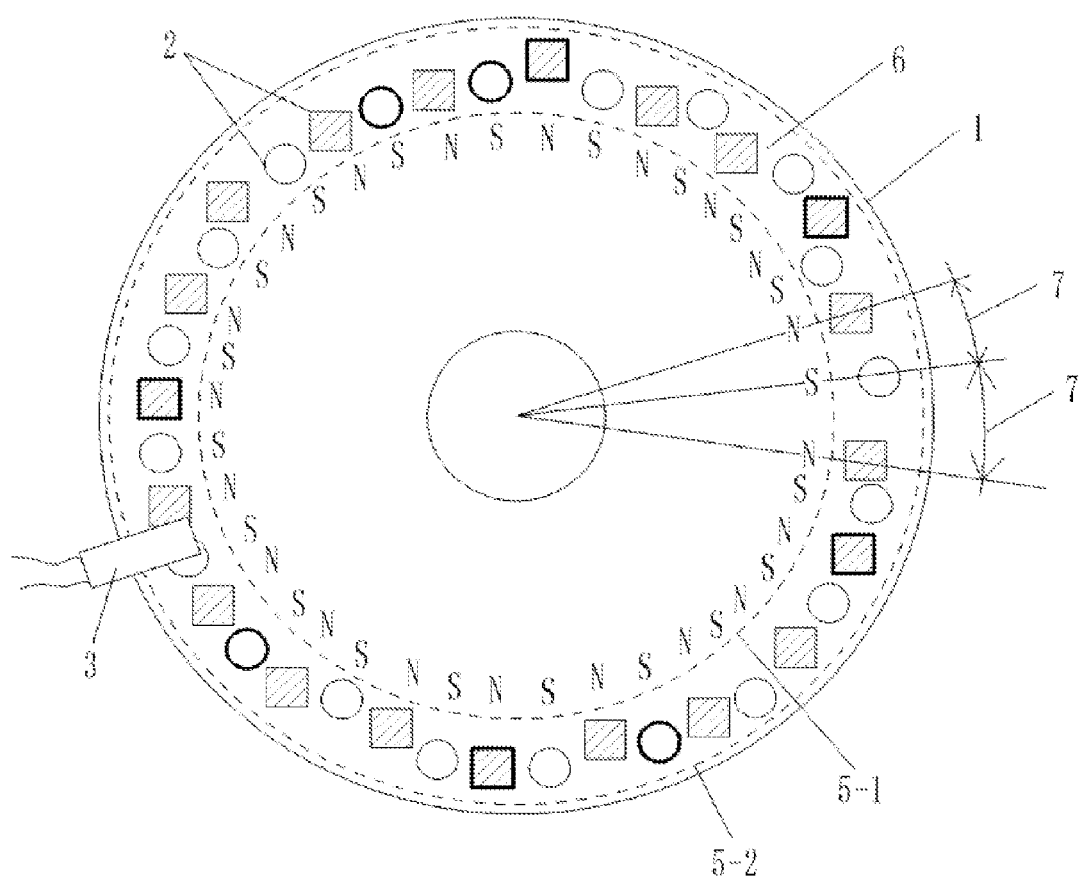
FIG. 2 is a sketch view of the sensing part according to the preferred embodiments of the present invention, wherein the dense magnet positions and the magnetic fluxes are unevenly distributed on the rotary wheel with the first ring-shaped groove and the permanent magnets are arranged in the N-S alternation order.

Second Preferred Embodiment-Power-assisted bicycle having sensor with dense magnet positions and magnetic fluxes unevenly distributed in shell As showed in FIGS. 2, 3, 4 and 6, according to a second preferred embodiment of the present invention, the surface of the rotary wheel 1 with the first ring-shaped groove, exposed within the hollow ring 41, has the diameter of 10.0 cm; 40 permanent magnets 2 are provided on the rotary wheel 1 with the first ring-shaped groove; each permanent magnet 2 has the diameter of 0.6 cm, and the magnetic flux within the range of 146-279(B·H)max/KJ·m$^{-3}$, wherein each two neighboring permanent magnets 2 have different magnetic fluxes; the Hall component 3 is spaced from each permanent magnet 2 at the rotating state by 0.2 cm, in such a manner that the Hall component 3 generates and outputs the corresponding rectangular wave electric signal when each permanent magnet 2 at the rotating state passes by the Hall component 3. The rotary wheel 1, the permanent magnets 2 and the Hall component 3 in the second preferred embodiment respectively have the same structures with the rotary wheel 1, the permanent magnets 2 and the Hall component 3 in the first preferred embodiment.

Third Preferred Embodiment-Circuit of power-assisted bicycle having sensor with multiple magnet positions and magnetic fluxes unevenly distributed in shell.

Figure 5:
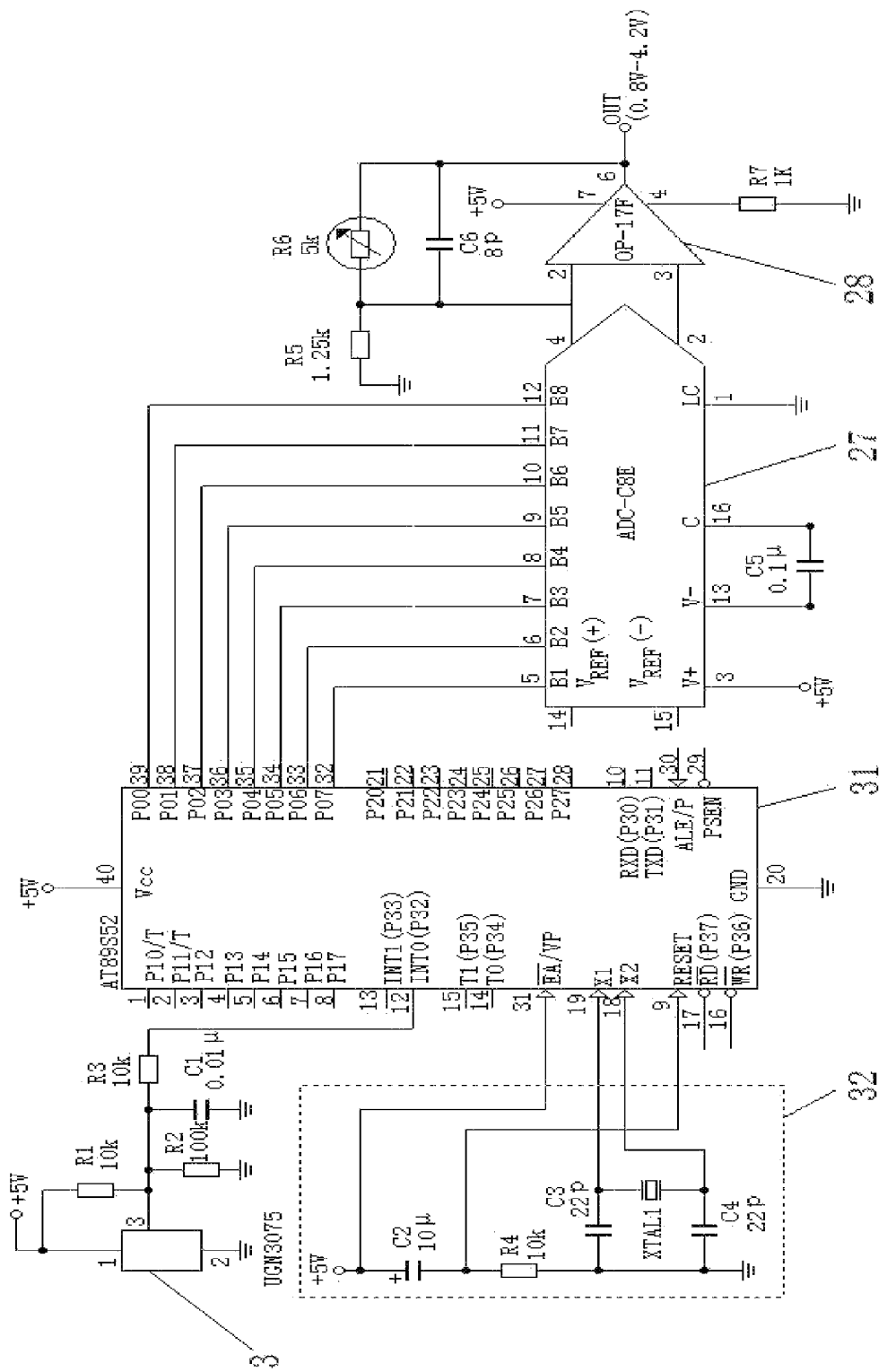
FIG. 5 is a circuit diagram of the Hall component, a single-chip microcomputer, the DAC and the OPA according to the preferred embodiments of the present invention.

As showed in FIGS. 1, 3, 5 and 6, similar to the first preferred embodiment, the sensor comprises the sensing element, the power assistance model processor 21, the DAC 27 and the OPA 28 which are connected successively.

(1) The Hall component of the sensing element adopts UGN3075; other parts of the sensing element are as illustrated in the first preferred embodiment.

(2) The power assistance model processor 21 is a single-chip computer 31, AT89S52. The AT89S52 single-chip microcomputer 31 accomplishes all functions of the identifier 22, the power assistance origin selector 23, the magnet rotation velocity calculator 24, the power assistance model memory 25 and the power assistance model calculator 26.

(3) The DAC 27 adopts ADC-C8E.

(4) The OPA 28 adopts OF-17F, wherein a thermo-sensitive resistor R6 of 5 k is connected between pin 2, an input terminal of the OF-17F OPA 28, and pin 6, an output terminal of the OF-17F OPA 28; a capacitor C6 of 8P is connected between two ends of the thermo-sensitive resistor R6 in parallel. A resistor R5 of 1.25K, connected between a pin 4 of the DAC 27 and the pin 2 of the OPA 28, is grounded. Therefore, a voltage range of the analog signal outputted by the pin 6 of the OPA 28, adjusted by the thermo-sensitive resistor R6, is stabilized between 0.8V and 4.2V.

Pin 3, a signal output terminal of the Hall component 3, is connected to pin 12 INTO (P32) of the single-chip microcomputer 31;

pin 39 P00 of the single-chip microcomputer 31 is connected to pin 12 B8 of the DAC 27;

pin 38 P01 of the single-chip microcomputer 31 is connected to pin 11 B7 of the DAC 27;

pin 37 P02 of the single-chip microcomputer 31 is connected to pin 10 B6 of the DAC 27;

pin 36 P03 of the single-chip microcomputer 31 is connected to pin 9 B5 of the DAC 27;

pin 35 P04 of the single-chip microcomputer 31 is connected to pin 8 B4 of the DAC 27;

pin 34 P05 of the single-chip microcomputer 31 is connected to pin 7 B3 of the DAC 27;

pin 33 P06 of the single-chip microcomputer 31 is connected to pin 6 B2 of the DAC 27;

pin 32 P07 of the single-chip microcomputer 31 is connected to pin 5 B1 of the DAC 27;

the pin 4 of the DAC 27 is connected to the pin 2 of the OPA 28;

pin 2 of the DAC 27 is connected to pin 3 of the OPA 28; and the pin 6 of the OPA 28 is an analog signal output terminal (5) The sensor comprises a mechanical part and a sensing part which are connected as follows. The mechanical part comprises the rotary wheel 1 with the first ring-shaped groove and the static wheel 40 with the second ring-shaped groove, embedded with the rotary wheel 1. The sensing part comprises the permanent magnets 2, the Hall component 3, the single-chip microcomputer 31, the DAC 27 and the OPA 28. The Hall component 3, the single-chip microcomputer 31, the DAC 27 and the OPA 28 which four are connected successively are provided on the circuit board 59. The permanent magnets 2 are mounted on an inner wall of the rotary wheel 1 within the hollow ring 41; the circuit board 59 is mounted on an inner wall of the static wheel 40 within the hollow ring 41. The Hall component 3 is so positioned on the circuit board 59 as to be able to sense the magnetic flux of each permanent magnet 2 and output the electric signal according to a change in the sensed magnetic flux. The sensing part of the sensor is for sensing. The mechanical part has two functions, firstly for mounting relative positions among each element of the sensing part so that each the element is integrated into a sensing functional assembly, and secondly for mounting the sensing functional assembly onto the electric power-assisted bicycle and sensing the motion states of the electric power-assisted bicycle by the sensing functional assembly. The four successively connected electronic elements, i.e., the Hall component 3, the single-chip microcomputer 31, the DAC 27 and the OPA 28, are provided on the circuit board 59, which contributes to an integration, a modularization and a miniaturization of the four electronic elements, facilitates integrally mounting the four electronic elements on the inner wall of the static wheel 40 with the second ring-shaped groove within the hollow ring 41, and simplifies a manufacture of the sensor.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A power-assisted bicycle, comprising: an electric power-assisted bicycle and a sensor, wherein: said electric power-assisted bicycle has a middle shaft; a sleeve pipe is sleeved around an intermediate section of said middle shaft; said middle shaft and said sleeve pipe are rotatably connected; a chain wheel is mounted on said middle shaft; two pedals are respectively mounted at two ends of said middle shaft; a battery on said electric power-assisted bicycle and a motor controller are connected; and, a motor on a wheel is connected to said motor controller; wherein:

said sensor has the following structures and connections:
said sensor comprises a sensing element, a power assistance model processor, a digital-to-analog converter (DAC) and an operational amplifier (OPA); wherein
firstly, said sensing element is for converting a rotary motion of a rotary wheel with a first ring-shaped groove into an output of a rectangular wave signal;
said sensing element comprises said rotary wheel with said first ring-shaped groove, a static wheel with a second ring-shaped groove, a Hall component and a plurality of permanent magnets; said first ring-shaped groove of said rotary wheel is opposed to said second ring-shaped groove of said static wheel; said second ring-shaped groove of said static wheel is embedded within said first ring-shaped groove of said rotary wheel, so as to form an embedded hollow shell having said two wheels relatively rotatable; said first ring-shaped groove and said second ring-shaped groove form a hollow ring where the plurality of said permanent magnets are mounted on said rotary wheel; the plurality of said permanent magnets are arranged circumferentially in an irregular manner;
said irregular manner is an irregular radius manner, or an irregular distance manner, or a combination of said irregular radius manner and said irregular distance manner;
in said irregular radius manner, the plurality of said permanent magnets are arranged within a ring formed by an inner circle and an outer circle; at least one circle between said inner circle and said outer circle passes through all of said permanent magnets; said inner circle and said outer circle are concentric; at least two of said permanent magnets are at different distances to a center of said inner circle;
in said irregular distance manner, a distance between each two neighboring permanent magnets is defined as a permanent magnet distance; at least two of said permanent magnet distances are different;
at a surface of said rotary wheel in proximity to said hollow ring, each two neighboring permanent magnets have opposite magnetic poles; all said permanent magnets on said rotary wheel with said first ring-shaped groove have said magnetic poles thereof arranged in an order of N pole, S pole, N pole, S pole, N pole and S pole; at least two of said permanent magnets have different magnetic fluxes;
said Hall component is mounted within said hollow ring on said static wheel with said second ring-shaped groove; said Hall component approximates to said permanent magnets and is positioned for sensing said magnetic flux of each permanent magnet; said Hall component is spaced from said permanent magnets; said Hall component is for generating said rectangular wave signal as said output according to said opposite magnetic poles;
secondly, said power assistance model processor is a signal form converter for converting a digital signal about a rotation of said rotary wheel into a power assistance model digital signal;
said power assistance model processor comprises an identifier for identifying an analog/digital conversion, a wave width and a wave peak, a power assistance origin selector, a magnet rotation velocity calculator, a power assistance model memory and a power assistance model calculator;
said identifier is connected to said sensing element; said identifier identifies a width and a peak of each rectangular wave of said rectangular wave signal which is outputted by said Hall component in said sensing element, converts each rectangular wave into respective digital signals and marks each rectangular wave; said identifier outputs a magnet motion digital signal which is marked with magnet position order;
said identifier is connected respectively to said power assistance origin selector and said magnet rotation velocity calculator; said power assistance origin selector is connected to said magnet rotation velocity calculator; said magnet rotation velocity calculator receives said magnet motion digital signal which is marked with said magnet position order, outputted by said identifier, and calculates out a rotation velocity of said rotary wheel with said received magnet motion digital signal; then, said magnet rotation velocity calculator sends a rotation velocity digital signal of said rotary wheel into said power assistance origin selector; with said magnet motion digital signal which is marked with said magnet position order and said rotation velocity digital signal of said rotary wheel, said power assistance origin selector determines said rectangular wave which corresponds to a power assistance origin under a certain rotation velocity, namely a power assistance origin magnet;

said power assistance origin selector and said magnet rotation velocity calculator are both connected to said power assistance model calculator; said power assistance model memory is connected to said power assistance model calculator; with said power assistance origin magnet determined by said power assistance origin selector and said rotation velocity of said rotary wheel calculated by said magnet rotation velocity calculator, said power assistance model calculator selects out a power assistance model within said power assistance model memory, substitutes said power assistance origin magnet and said rotation velocity of said rotary wheel into said selected power assistance model, and calculates out said power assistance model digital signal corresponding to said substituted power assistance origin magnet and said substituted rotation velocity of said rotary wheel; said power assistance model calculator outputs said power assistance model digital signal;

thirdly, said DAC is for converting said power assistance model digital signal into an analog signal of said power assistance model;

said power assistance model calculator is connected to said DAC; said DAC converts said power assistance model digital signal of said power assistance model calculator into said analog signal of said power assistance model; and fourthly, said OPA is for converting said analog signals of said power assistance model of said DAC into analog signals of said power assistance model under a rated voltage range;

said sensor is connected to said electric power-assisted bicycle as follows; said rotary wheel with said first ring-shaped groove of said sensor and said static wheel with said second ring-shaped groove of said sensor are sleeved around said middle shaft of said electric power-assisted bicycle; said static wheel is mounted on said sleeve pipe around said middle shaft; said rotary wheel is mounted on said middle shaft of said electric power-assisted bicycle; said rotary wheel synchronously rotates with said middle shaft; said rotary wheel and said static wheel are mutually sleeved and embedded for a rotatable connection; said rotary wheel and said middle shaft have the same rotation center; a signal output wire of said OPA of said sensor is connected to a signal input terminal of said motor controller of said electric power-assisted bicycle.

2. The power-assisted bicycle, as recited in claim 1, further comprising a thermo-sensitive resistor connected between an input terminal and an output terminal of said OPA.

3. The power-assisted bicycle, as recited in claim 2, wherein said power assistance model processor is a single-chip microcomputer which is connected to a clock circuit, and said sensor comprises a mechanical part and a sensing part which are connected; wherein said mechanical part comprises said rotary wheel with the first ring-shaped groove and said static wheel with said second ring-shaped groove, embedded with said rotary wheel; said sensing part comprises the plurality of said permanent magnets, said Hall component, said single-chip microcomputer, said DAC and said OPA; four electronic elements comprising said Hall component, said single-chip microcomputer, said DAC and said OPA which are connected successively are provided on a single circuit board; the plurality of said permanent magnets are mounted on an inner wall of said rotary wheel within said hollow ring; said circuit board is mounted on an inner wall of said static wheel within said hollow ring; said Hall component is so positioned on said circuit board as to be able to sense said magnetic flux of each said permanent magnet and output an electric signal according to a change in said sensed magnetic flux.

4. The power-assisted bicycle, as recited in claim 3, wherein said power assistance model processor is a single-chip microcomputer; said thermo-sensitive resistor is connected between a first pin of said OPA which is said input terminal of said OPA, and a second pin of said OPA which is said output terminal of said OPA;

a signal output terminal of said Hall component is connected to a first pin of said single-chip microcomputer;

a second pin of said single-chip microcomputer is connected to a first pin of said DAC;

a third pin of said single-chip microcomputer is connected to a second pin of said DAC;

a fourth pin of said single-chip microcomputer is connected to a third pin of said DAC;

a fifth pin of said single-chip microcomputer is connected to a fourth pin of said DAC;

a sixth pin of said single-chip microcomputer is connected to a fifth pin of said DAC;

a seventh pin of said single-chip microcomputer is connected to a sixth pin of said DAC;

an eighth pin of said single-chip microcomputer is connected to a seventh pin of said DAC;

a ninth pin of said single-chip microcomputer is connected to an eighth pin of said DAC;

a ninth pin of said DAC is connected to said first pin of said OPA;

a tenth pin of said DAC is connected to a third pin of said OPA; and said second pin of said OPA is an analog signal output terminal.

5. The power-assisted bicycle, as recited in claim 4, further comprising bearings which are provided between an outer surface of an inner ring of said static wheel and an inner surface of an inner ring of said rotary wheel.

6. The power-assisted bicycle, as recited in claim 4, wherein an outer surface of said static wheel has a circular depression; said circular depression is engaged with said sleeve pipe around said middle shaft of said electric power-assisted bicycle, so as to form a fixed connection by engaging said sleeve pipe within said circular depression.

7. The power-assisted bicycle, as recited in claim 4, wherein said Hall component is provided between said inner circle and said outer circle.

8. The power-assisted bicycle, as recited in claim 7, wherein said rotary wheel with said first ring-shaped groove has a central hole within said inner circle of said permanent magnets.

9. The power-assisted bicycle, as recited in claim 8, wherein at least one said permanent magnet distance is different from other said permanent magnet distances; and said magnetic flux of at least one said permanent magnet is different from said magnetic fluxes of other permanent magnets.

10. The power-assisted bicycle, as recited in claim 9, wherein said rotary wheel with said first ring-shaped groove is made of one non-permeability magnetic material of plastic plates, aluminum plates and copper plates.

* * * * *